(12) United States Patent
Effing et al.

(10) Patent No.: US 12,135,004 B2
(45) Date of Patent: Nov. 5, 2024

(54) TUBULAR TURBINE DEVICE FOR A FLUID TRANSPORT NETWORK

(71) Applicants: Christian Effing, Essen (DE); Andreas Brümmer, Essen (DE); Felix Nal, Essen (DE); Guido Neuhaus, Essen (DE)

(72) Inventors: Christian Effing, Essen (DE); Andreas Brümmer, Essen (DE); Felix Nal, Essen (DE); Guido Neuhaus, Essen (DE)

(73) Assignee: RWE Gas Storage West GmbH, Essen (DE)

(*) Notice: Subject to any disclaimer, the term of this patent is extended or adjusted under 35 U.S.C. 154(b) by 0 days.

(21) Appl. No.: 18/423,808

(22) Filed: Jan. 26, 2024

(65) Prior Publication Data

US 2024/0209826 A1 Jun. 27, 2024

Related U.S. Application Data

(63) Continuation of application No. PCT/EP2022/069973, filed on Jul. 18, 2022.

(51) Int. Cl.
*F03B 13/00* (2006.01)
*F17D 1/02* (2006.01)
*H02K 7/18* (2006.01)

(52) U.S. Cl.
CPC ............... *F03B 13/00* (2013.01); *F17D 1/02* (2013.01); *H02K 7/1823* (2013.01); *F05B 2220/20* (2013.01)

(58) Field of Classification Search
CPC .............................. F03B 13/00; H02K 7/1823
See application file for complete search history.

(56) References Cited

U.S. PATENT DOCUMENTS

| | | | | |
|---|---|---|---|---|
| 621,864 | A | * 3/1899 | Smith | F16K 1/305 |
| | | | | 137/499 |
| 2,436,683 | A | * 2/1948 | Wood, Jr. | H02K 5/128 |
| | | | | 290/43 |
| 2,634,375 | A | 4/1953 | Guimbal | |
| 2,782,321 | A | * 2/1957 | Fischer | F03B 3/10 |
| | | | | 415/24 |

(Continued)

FOREIGN PATENT DOCUMENTS

| | | |
|---|---|---|
| DE | 1503265 A1 | 7/1970 |
| DE | 102018209204 A1 | 12/2019 |

(Continued)

*Primary Examiner* — Tulsidas C Patel
*Assistant Examiner* — Thomas K Quigley
(74) *Attorney, Agent, or Firm* — Reinhart Boerner Van Deuren P.C.

(57) ABSTRACT

The application relates to a tubular turbine device for a fluid transport network, including at least one running equipment arranged on a turbine shaft, at least one guiding equipment arranged upstream at the running equipment, and at least one generator coupled to the turbine shaft and configured to convert a mechanical energy into electrical energy, at least one cross-section adjustment equipment configured to change a cross-sectional area of the tubular turbine device that can be flowed through depending on the volume flow of the fluid flowing through the tubular turbine device.

13 Claims, 9 Drawing Sheets

(56) References Cited

U.S. PATENT DOCUMENTS

| | | | | |
|---|---|---|---|---|
| 2,917,636 | A | | 12/1959 | Akeley |
| 4,176,283 | A | * | 11/1979 | McLaren ............... F03B 13/083 416/177 |
| 4,328,831 | A | * | 5/1982 | Wolff ...................... B65G 53/30 251/59 |
| 4,555,637 | A | * | 11/1985 | Irvine ..................... F01D 15/10 416/DIG. 4 |
| 4,740,711 | A | * | 4/1988 | Sato ...................... F01B 13/061 290/52 |
| 5,143,116 | A | * | 9/1992 | Skoglund ............. G05D 7/0126 137/487 |
| 5,417,083 | A | * | 5/1995 | Eber ...................... F16K 31/041 251/285 |
| 5,664,760 | A | * | 9/1997 | Army, Jr. ................ F16K 47/08 138/44 |
| 6,011,334 | A | * | 1/2000 | Roland ................... H02K 7/11 310/104 |
| 6,029,702 | A | * | 2/2000 | Leinen .................. F16K 47/045 251/121 |
| 6,056,518 | A | * | 5/2000 | Allen .................. F04D 29/0413 417/355 |
| 6,267,551 | B1 | * | 7/2001 | Dentinger ................ F03B 3/126 415/214.1 |
| 6,848,503 | B2 | * | 2/2005 | Schultz .................. F03B 13/00 310/156.01 |
| 6,945,264 | B1 | * | 9/2005 | Denzel .................... F16K 3/085 137/454.6 |
| 7,091,628 | B1 | * | 8/2006 | Balt ......................... F03G 7/00 290/43 |
| 7,723,860 | B2 | * | 5/2010 | Nagler ................... F03B 13/00 290/43 |
| 7,850,143 | B1 | * | 12/2010 | Rosada ................. F16K 5/0631 251/316 |
| 9,166,458 | B1 | * | 10/2015 | Burns, III ............. F03B 17/005 |
| 9,243,604 | B2 | * | 1/2016 | Montgomery .......... F03B 13/00 |
| 9,506,785 | B2 | * | 11/2016 | Turk ....................... G01F 1/065 |
| 9,583,993 | B1 | * | 2/2017 | Kaiser .................... F03B 13/00 |
| 10,458,554 | B2 | * | 10/2019 | Gattavari ............... F16K 47/08 |
| 10,844,847 | B2 | * | 11/2020 | Fukaya ................. F03G 7/0252 |
| 11,223,265 | B2 | * | 1/2022 | Gerard ................... H02K 7/083 |
| 11,271,453 | B2 | * | 3/2022 | Holm .................... F03B 17/061 |
| 2002/0117214 | A1 | * | 8/2002 | Tucker ............... G05D 16/2053 137/487.5 |
| 2008/0060712 | A1 | * | 3/2008 | Gluzman .......... B01F 25/43151 138/42 |
| 2008/0252078 | A1 | | 10/2008 | Myers et al. |
| 2012/0031518 | A1 | * | 2/2012 | Smith ..................... F03B 13/00 138/108 |
| 2013/0277119 | A1 | * | 10/2013 | Rogers ................... E21B 47/18 175/317 |
| 2013/0309071 | A1 | * | 11/2013 | Hunter ................... F03B 15/06 415/146 |
| 2014/0375057 | A1 | * | 12/2014 | Bazaz ...................... F03D 1/04 290/52 |
| 2015/0001141 | A1 | * | 1/2015 | Wieland ................. F03B 13/10 290/43 |
| 2015/0102603 | A1 | * | 4/2015 | Schaefer ................ G01F 15/00 290/52 |
| 2015/0214879 | A1 | * | 7/2015 | Huntington ............. F02C 6/00 290/40 B |
| 2016/0025514 | A1 | * | 1/2016 | Pitchford ............... G01D 4/006 290/52 |
| 2016/0084218 | A1 | * | 3/2016 | Obermeyer ............ F03B 15/14 415/208.2 |
| 2016/0290310 | A1 | * | 10/2016 | Bhende ................. H02K 7/1823 |
| 2019/0085833 | A1 | * | 3/2019 | Fukaya .................... F25B 9/00 |
| 2023/0390670 | A1 | * | 12/2023 | McFadyen .......... B01F 27/1921 |

FOREIGN PATENT DOCUMENTS

| | | |
|---|---|---|
| EP | 0568909 A1 | 11/1993 |
| EP | 0609674 A2 | 8/1994 |
| EP | 1905948 A1 | 4/2008 |
| EP | 3001012 A2 | 3/2016 |
| JP | 3612153 A | 5/1998 |
| WO | WO 98/57046 A1 | 12/1998 |
| WO | WO 2016/120626 A1 | 8/2016 |

* cited by examiner

TUBULAR TURBINE DEVICE FOR A FLUID TRANSPORT NETWORK

CROSS-REFERENCE TO RELATED PATENT APPLICATIONS

This patent application is a continuation of International Application No. PCT/EP2022/069973, filed on Jul. 18, 2022, which claims the benefit of priority to German Patent Application No. 10 2021 119 820.8, filed Jul. 30, 2021, the entire teachings and disclosures of both applications are incorporated herein by reference thereto.

BACKGROUND OF THE INVENTION

The application relates to a tubular (bulb) turbine device for a fluid transport network comprising at least one running equipment arranged on a turbine shaft, at least one guiding equipment arranged upstream of the running equipment in the direction of flow, and at least one generator coupled to the turbine shaft and configured to convert the mechanical energy into electrical energy. In addition, the application relates to a method of operating a tubular turbine device, a fluid pressure release system, and a use of a tubular turbine device.

Fluid transport networks are used in the prior art for transporting a fluid. A fluid transport network generally comprises transport network pipes and transport network lines, respectively, through which the fluid is transported under pressure. The fluid thus flows through the at least one transport network pipe.

An example of a fluid transport network is a gas transport network for conveying and transporting, respectively, a gas. Such a gas transport network may be formed of at least one long-distance gas transport network and, in particular, a plurality of gas distribution networks coupled to the long-distance gas transport network. A long-distance gas transportation network may be formed by a plurality of long-distance transportation pipes (e.g., made of steel). Similarly, a gas distribution network may be formed by a plurality of distribution pipes (e.g., made of steel).

For example, from a gas source (e.g., a gas storage), the gas may first be transported by means of the long-distance gas transport network. The gas can then be transported to a (final) consumer (also called end customer) by means of a gas distribution network connected to the long-distance gas transport network. The transport of the gas is usually conducted in the gas transport network at different pressure levels.

For example, a long-distance gas transport network can be operated with a gas pressure respectively gas pressure level between 90 bar and 110 bar. The gas pressure level and pipeline pressure, respectively, of a gas distribution network can be in the range of 16 bar, for example (this is the case in Germany, for example). Up to an end user, the pipeline pressure can be further reduced, for example to a few millibars overpressure.

For an appropriate gas pressure release, a gas pressure release system can be used in the gas transport network, for example, between a long-distance gas transport network and a gas distribution transport network (or at other locations where a gas release is required). A gas release system may comprise one or more gas release facilities. A gas release facility may comprise at least one turbine device for gas release.

From the document EP 3 001 012 A2 a possibility is known, with which a gas pressure release required in a gas transport network can be used effectively. For example, EP 3 001 012 A2 describes a tubular turbine device for a gas transport network comprising at least one running equipment arranged on a turbine shaft, at least one guiding equipment arranged upstream of the running equipment in the direction of flow, and at least one generator coupled to the turbine shaft and configured to convert the mechanical energy into electrical energy. In particular, during a gas pressure release, the kinetic energy of the gas is converted into electrical energy by the running equipment coupled to the turbine shaft and the generator coupled to the turbine shaft. The electrical energy can be fed into an electrical distribution network, for example.

However, a disadvantage of the tubular turbine device according to EP 3 001 012 A2 is that the maximum possible electrical energy and power, respectively, is not always generated. It has been recognized that the reason for the non-optimal electrical energy yield is the fixed-impinged tubular turbine device. A fixed-impinged tubular turbine device means in particular that the tubular turbine device is designed for a specific, usually the maximum possible, fluid volume flow. At this volume flow, the tubular turbine device generates the maximum electrical energy respectively power in the nominal rating. However, it has been recognized that in a gas transport network, but also in other fluid transport networks where in particular a pressure release is required, (time-dependent and in particular strongly) fluctuating volume flows occur, thus in particular also strongly reduced volume flows. This leads to the fact that in particular the electrical energy yield is significantly reduced in a tubular turbine device according to EP 3 001 012 A2.

Therefore, the object of the application is to provide a tubular turbine device for a fluid transport network, in particular a gas transport network, in which the previously described problem is reduced and in particular the electrical energy yield is increased.

SUMMARY OF THE INVENTION

The object is solved according to a first aspect of the application by a tubular turbine device for a fluid transport network, in particular a gas transport network, according to the present disclosure. The tubular turbine device comprises at least one running equipment arranged on a turbine shaft. The tubular turbine device comprises at least one guiding equipment arranged upstream of the running equipment in the direction of flow. The tubular turbine device comprises at least one generator coupled to the turbine shaft and configured to convert the mechanical energy into electrical energy. The tubular turbine device comprises at least one cross-section adjustment equipment configured to change a cross-sectional area of the tubular turbine device that can be flowed through depending on the volume flow of the fluid flowing through the tubular turbine device.

In contrast to the prior art, according to the application, a tubular turbine device for a fluid transport network, in particular a gas transport network, is provided in which the previously described problem is reduced and the electrical energy yield is increased by integrating a cross-section adjustment equipment in the tubular turbine device, wherein the cross-section adjustment equipment can change the through-flowable input cross-sectional area and/or output cross-sectional area of the tubular turbine device depending on the volume flow of the fluid flowing through the tubular turbine device.

By integrating the variably adjustable, adaptive partial impingement, a significant extension of the optimal operating range of the (inline) tubular turbine is possible. In particular, a power control is made possible by geometric adjustment of the flow cross-section and cross-sectional area, respectively, during operation, in contrast to the known fixed impinged tubular turbine device. According to the application, it is possible to use a substantially wider volume flow range without any significant loss of efficiency. For a selected turbine stage, the adjustment of the flow cross-section in or at the guiding equipment enables optimum utilization of the energy potential available in the fluid flow.

The tubular turbine device according to the application, also called inline tubular turbine, is used in a fluid transport network. The tubular turbine device is (in principle) configured to perform a fluid pressure release in a fluid transport network from a first fluid pressure level to a second fluid pressure level. The second fluid pressure level is lower than the first fluid pressure level. Performing a fluid pressure release means in particular that a pressurized fluid is expanded by dissipating work.

In principle, the fluid can be a fluid that is transported under pressure through a fluid transport network. Preferably, the fluid according to the application is a gaseous fluid and a gaseous medium, respectively. In particular, the gaseous medium may be an industrial gas and/or a fuel gas.

Exemplary and non-exhaustive gaseous media are in particular natural gas, biogas, and hydrogen. Natural gas is in particular a gas mixture based on methane, the composition and calorific value of which may vary. The term biogas in particular also refers to a gas mixture based on methane, which may also vary in composition and calorific value.

The tubular turbine device may comprise a turbine housing. The turbine housing may be made of metal, in particular steel. The turbine housing may comprise an inlet to which a first transport network pipe and first transport network line, respectively, of the fluid transport network may be connected. The turbine housing may comprise an outlet, in particular on the side of the turbine housing opposite the inlet, to which a second transport network pipe and a second transport network pipe, respectively, of the fluid transport network can be connected. For example, the turbine housing may be formed as a substantially straight-line continuation of said transport network pipes. The first transport network pipe and the second transport network pipe may in particular be flangeable to the inlet and the outlet, respectively.

The tubular turbine device comprises (in particular within the turbine housing) at least one running equipment arranged (and mounted, respectively) on a turbine shaft. The turbine shaft is thus coupled (mechanically, in particular by torque-locked) to the running equipment. The running equipment comprises in particular a runner with a plurality of runner blades.

The fluid flowing from the inlet to the outlet causes in particular a mechanical movement of the running equipment. This leads to a decompression of the fluid pressure. Furthermore, the mechanical movement of the running equipment is transferred to the turbine shaft, in particular, into a rotational movement of the turbine shaft.

According to the application, the turbine shaft is (mechanically) coupled to at least one generator. The generator is thus arranged and mounted, respectively, in particular on the turbine shaft. In other variants, an indirect coupling may be provided, for example a gearbox may be interposed.

The generator converts (in a conventional manner) the rotational movement of the shaft respectively the rotational energy into electrical energy. In other words, the at least one generator coupled to the turbine shaft is configured to convert the mechanical energy into electrical energy.

For example, the generator may be an asynchronous machine. In particular, the at least one generator may be "floating" in the turbine housing. The generator and the generator housing, respectively, can be circulated around at least partially by the fluid.

The at least one generator may be arranged upstream of the running equipment in the direction of flow. Alternatively, the at least one generator may be arranged downstream of the running equipment in the direction of flow or, in addition to the generator, a further generator may be arranged upstream of the running equipment. The arrangement of the at least one generator may depend in particular on the fluid to be transported. In particular, for hydrogen, it is advantageous to arrange the generator upstream of the running equipment in the direction of flow. With hydrogen, an optimized cooling can be achieved by a corresponding arrangement. In the case of natural gas or biogas, it can be advantageous to arrange the generator downstream of the running equipment. The reason for this is that the gas temperature drops due to the gas decompression and therefore the gas has a lower temperature in the flow direction downstream of the running equipment than upstream of the running equipment. Cooling can be improved. At the same time, the generator can increase the gas temperature (this is usually desirable). In other words, in one case the generator waste heat can be used and in the other case the cooling effect on the generator can be improved. The advantage of having two generators can be, in particular, that they can have a smaller interference contour for the same total power.

In particular for an optimized flow of the fluid to the running equipment (in particular, the runner blades), a guiding equipment and steering equipment, respectively, is arranged upstream of the running equipment in the direction of flow. In particular, the guiding equipment is adapted to the running equipment. Preferably, the guiding equipment is configured to guide the fluid onto the running equipment with a specific direction.

In a preferred embodiment, the tubular turbine device may be formed in the form of a constant pressure turbine. Preferably, the running equipment may comprise a runner having a plurality of runner blades. The guiding equipment may be adapted to this running equipment. In particular, a plurality of guide channels and nozzle channels (also referred to as nozzles), respectively, can be arranged in the guiding equipment, which guide and, in particular, accelerate the fluid flow onto the runner blades in such a way that the runner blades are (optimally) flowed against.

In other words, in a tubular turbine device, in particular in the form of a constant-pressure turbine, a (driving) fluid can flow in one or more jets at very high velocity from one or more nozzles of the guiding equipment, wherein the nozzles are arranged (tangentially) to the circumference of the runner, onto the blades of the runner.

According to the application, it has been recognized that for an at least near-optimal operation of the tubular turbine device, in particular, of the generator of the tubular turbine device coupled to the running equipment by means of a turbine shaft, the inlet cross-section of the tubular turbine device that can be flowed through is changeable. In particular, this means that the inlet cross-section is adjustable at least between two different cross-sectional values and cross-sectional areas, respectively. Preferably, the input cross-section can be changed between a maximum input cross-section (-value) and a minimum input cross-section (-value), in particular, in a discrete or continuous manner, by the cross-section adjustment equipment. In particular, the input cross-section can be increased up to the maximum input cross-section (−value) and decreased down to the minimum input cross-section (−value).

Preferably, the cross-sectional area of the tubular turbine device that can be flowed through presently means a through-flowable input and/or through-flowable output cross-sectional area. In particular, the cross-sectional area of the tubular turbine device that can be flowed through presently means a cross-sectional area through which the fluid can flow and which is variable in cross-section and which is arranged (located inside the tubular turbine device) at least upstream of the running equipment. In particular, an inlet cross-sectional area is located between the running equipment and the inlet. An outlet cross-sectional area may be located downstream of the running means and upstream of the outlet.

In particular, the cross-section adjustment equipment may comprise at least one adjustable and movable, respectively, cross-section adjustment module, which is configured to change the cross-sectional area that can be flowed through by an adjustment and movement, respectively.

According to one embodiment of the tubular turbine device according to the application, the cross-section adjustment equipment may be configured to reduce the cross-sectional area when the volume flow of the fluid flowing through the tubular turbine device is reduced. In other words, a reduction in volume flow can cause a (passive) reduction in cross-sectional area. The more the volume flow is reduced, the more the cross-sectional area can be reduced. In particular, the at least one cross-section adjustment module can be (actively) moved in such a way that the cross-sectional area that can be flowed through to the running equipment is reduced (compared to the cross-sectional area that can be flowed through to the running equipment at a higher volume flow).

Alternatively or, preferably, additionally, the cross-section adjustment equipment may be configured to increase the cross-sectional area when the volume flow of the fluid flowing through the tubular turbine device increases. In other words, an increase in volume flow may cause an increase in cross-sectional area. The more the volume flow increases, the more the cross-sectional area may increase. In particular, the at least one cross-section adjustment module can be moved such that the cross-sectional area that can be flowed through to the running equipment is increased (compared to the cross-sectional area that can be flowed through to the running equipment at a lower volume flow).

Preferably, the change by the cross-section adjustment equipment may depend on a (predetermined) mathematical relationship (e.g., function, table, etc.) between volume flow and cross-sectional area to be adjusted.

According to a preferred embodiment of the tubular turbine device according to the application, the cross-section adjustment equipment may be configured to change the cross-sectional area in such a way that the flow velocity of the fluid flowing through the tubular turbine device through the cross-sectional area remains substantially the same. This means, in particular, that the fluid always flows against or through the runner equipment and guiding equipment with the at least almost same flow velocity (in meridian direction). In particular, this is performed in such a way that the flow angles of the velocity fields remain almost the same for a constant circumferential velocity. In particular, the flow velocity is related to the volume flow and the cross-sectional area according to the following relationship:

$$v\_m = Q/A \qquad (1)$$

wherein $v\_m$ is the flow velocity in the meridian direction, Q is the volume flow, and A is the cross-sectional area. As can be seen, when the volume flow Q is changed, the flow velocity can be kept substantially at least nearly constant at a certain (desired) set point value by changing the cross-sectional area A that can be flowed through by the fluid, i.e., the input cross-sectional area A and/or the output cross-sectional area A.

In this way, the operation of the tubular turbine device, in particular of the generator of the tubular turbine device coupled to the running equipment by means of a turbine shaft, can be optimized even further and thus, in particular, the electrical energy yield can be increased.

According to a further embodiment of the tubular turbine device according to the application, the cross-section adjustment equipment may be a passively operated cross-section adjustment equipment. A passively operated cross-section adjustment equipment means, in particular, a cross-section adjustment equipment that is operable without externally supplied energy. The advantage of a passive design is in particular—compared to an actively operated cross-section adjustment equipment—the low effort and/or the low complexity of such a device.

A passively operated cross-section adjustment equipment may preferably comprise a (previously described) cross-section adjustment module with a (passively operated) resetting element. A cross-section adjustment module with resetting element may be configured to change the cross-sectional area that can be flowed through, i.e., in particular to reduce or increase it, depending on the force exerted by the flowing fluid on the passive cross-section adjustment module (and thus on the instantaneous volumetric flow through the tubular turbine device).

According to a further embodiment of the tubular turbine device according to the application—in particular as an alternative to the passively operated cross-section adjustment equipment—the cross-section adjustment equipment may be an actively operated cross-section adjustment equipment. An actively operated cross-section adjustment equipment means in particular a cross-section adjustment equipment that can be operated with energy supplied from outside. The advantage of an active design is in particular—compared to a passively operated cross-section adjustment equipment—the increased accuracy in adjusting the (essentially) optimum cross-sectional area.

An actively operated cross-section adjustment equipment can, in particular, comprise a cross-section adjustment module with an (actively operated) servomotor and, in particular, a control module for controlling the servomotor. The control module may, in particular, be integrated in the servomotor. The servomotor can be, for example, an electric motor or a hydraulic motor.

According to a preferred embodiment, the actively operated cross-section adjustment equipment may comprise at least one cross-section adjustment module adjustable by a servomotor configured to change the cross-sectional area that can be flowed through (as has already been described). The actively operated cross-section adjustment equipment may comprise at least one control module configured to control the servomotor depending on a provided (measured) fluid volume value and a predetermined fluid volume set point.

The provided (instantaneous) fluid volume value may, for example, be measured by a measuring module (anyway) arranged in a control station of the fluid transport network and in particular then transmitted to the control module. Alternatively or additionally, the tubular turbine device may comprise a measuring module configured to measure the (instantaneous) fluid volume value in the tubular turbine device. Preferably, the measurement module may perform the measurement downstream of the cross-section adjustment equipment (i.e., in particular, downstream of the variable cross-sectional area) and upstream of the running equipment. The measurement module may be configured to provide the measured fluid volume value to the control module.

Further, a fluid volume set point may be predetermined such that the tubular turbine device is (always, at least nearly always) operated at the optimum operating point. The electrical energy yield can be further improved. The control module can be integrated in the servomotor, for example. The servomotor can be controlled, in particular regulated, in such a way that the fluid hitting the running equipment always has a specific flow velocity, in particular, the optimum flow velocity (in amount and direction).

A fluid volume value (or fluid volume set point) is in particular a value that has a (specific) relationship with the fluid volume, and in particular a value that is based on a measured fluid parameter. For example, a fluid volume value may also be a measured flow velocity value. The same applies accordingly to the at least one fluid volume set point value.

It shall be understood that in variants of the application, the cross-section adjustment equipment may also comprise a passively operated cross-section adjustment module and an actively operated cross-section adjustment module.

According to a further embodiment, the cross-section adjustment equipment may be arranged upstream of the guiding equipment (and downstream of the inlet of the turbine housing) and/or immediately upstream or downstream of the runner.

In a further embodiment, the cross-section adjustment equipment can also be integrated in the guiding equipment, in particular, in at least one flow channel and nozzle channel, respectively, of the guiding equipment (preferably in a plurality of the nozzle channels, in particular preferably in all nozzle channels).

It shall be understood that, in variants of the application, a cross-section adjustment equipment may also be arranged upstream of the guiding equipment (and downstream of the inlet of the turbine housing) and a further cross-section adjustment equipment may be integrated in the guiding equipment and/or immediately upstream or downstream of the runner.

In principle, there are a plurality of embodiments for a cross-section adjustment equipment. In particular, the embodiment can be selected depending on the installation situation in the turbine (e.g., within a pressurized pipeline; generator in the pipeline flowed around by the gas; generator upstream, downstream, or positionable on both sides of the turbine stage to increase power).

According to a preferred embodiment of the tubular turbine device, the cross-section adjustment equipment may comprise at least one rotating disc module (also referred to as washer disc) arranged upstream of the guiding equipment. The rotating disc module may comprise at least one through-flow opening adjustable between a maximum cross-sectional area and a minimum cross-sectional area (also zero).

In the present embodiment, the rotating disc module may in particular be a cross-section adjustment module as previously described. Preferably, such a cross-section adjustment equipment may be an actively operated cross-section adjustment equipment. In particular, a change of the at least one through-flow opening can be caused by a rotating action, for example, caused by a servomotor (described before). In particular, the through-flow opening respectively its through-flow cross-section can be changed in such a way that the cross-sectional area that can be flowed through is changed.

In principle, in this embodiment, a through-flow opening can presently mean an overall through-flow opening, which can be formed from a plurality of individual through-flow openings (also called flow channels).

Preferably, the rotating disc module may comprise at least one first disc having at least one first disc opening and one second disc disposed above the first disc and having at least one second disc opening corresponding to the first disc opening. In particular, at least two first disc openings and two second disc openings may be provided. Corresponding means that a first disc opening may be matched in position and shape to at least one second disc opening so that a through-flow opening having a certain cross-sectional area may be formed by the first disc opening and the second disc opening.

By rotating (about an axis of rotation, preferably the turbine axis) the second disc relative to the first disc, the cross-sectional area of the at least one through-flow opening can be adjusted between the maximum cross-sectional area (in this case the first disc opening and the second disc opening (resp. the first disc openings and the second disc openings) lie substantially on top of each other) and a minimum cross-sectional area (in this case the first disc opening and the second disc opening (resp. the first disc openings and the second disc openings) do not lie substantially on top of each other; it may also be provided that only a first of a plurality of openings lies on top of one second of a plurality of openings).

In particular, the second disc and/or the first disc may be adjustable respectively movable by a servomotor. Preferably, the servomotor may be an electric servomotor. Preferably, the at least one generator of the tubular turbine device can supply the at least one servomotor with electrical energy.

According to a further embodiment of the tubular turbine device according to the application, the cross-section adjustment equipment may comprise at least one rotating cylinder module (also referred to as sleeve module) arranged upstream of the guiding equipment. The cylinder module may include at least one through-flow opening adjustable between a maximum cross-sectional area and a minimum cross-sectional area. Rotatable and rotating, respectively, means that at least one part (first cylinder) of the cylinder module is rotatable, in particular with respect to another part (second cylinder) of the cylinder module. At least one of these parts may be immovable with respect to turbine housing.

In the present embodiment, the rotating cylinder module may in particular be a cross-section adjustment module as previously described. Preferably, such a cross-section adjustment module may be an actively operated cross-section adjustment module. In particular, a change of the at least one through-flow opening can be caused by a rotating action, for example, caused by a servomotor (described before). In particular, the through-flow opening respectively its flow cross-section can be changed in such a way that the cross-sectional area that can be flowed through is changed.

In principle, in this embodiment, a through-flow opening may predominantly mean an overall through-flow opening, which may be formed from a plurality of individual through-flow openings.

Preferably, the rotating cylinder module may comprise at least one first cylinder having at least one first cylinder opening and one second cylinder disposed in the first cylinder and having at least one second cylinder opening corresponding to the first cylinder opening. In particular, at least two first cylinder openings and/or at least two second cylinder openings may be provided. Corresponding means that a first cylinder opening can be matched in position and shape to at least one second cylinder opening so that a through-flow opening with a certain cross-sectional area can be formed by the first cylinder opening and the second cylinder opening.

By rotating (about an axis of rotation, preferably the turbine axis) the second cylinder relative to the first cylinder, the cross-sectional area of the at least one through-flow opening can be adjusted between the maximum cross-sectional area (in this case, the first cylinder opening and the second cylinder opening (resp. the first cylinder openings and the second cylinder openings) lie substantially on top of each other) and a minimum cross-sectional area (in this case, the first cylinder opening and the second cylinder opening (resp. the first cylinder openings and the second cylinder openings) do not lie substantially on top of each other; it may also be provided that only a first one of a plurality of openings lies above a second one of a plurality of openings).

In particular, the second cylinder and/or the first cylinder may be adjustable respectively movable by a servomotor. Preferably, the servomotor may be an electric servomotor. Preferably, the at least one generator of the tubular turbine device can supply the at least one servomotor with electrical energy. At least one of the cylinders may be at least partially integrated in the guiding equipment.

According to a further embodiment of the tubular turbine device according to the application, the cross-section adjustment equipment may comprise at least one cylinder module arranged upstream of the guiding equipment in the flow direction and displaceable in the axial direction of the tubular turbine device (respectively in the flow direction). The cylinder module may comprise at least one through-flow opening adjustable between a maximum cross-sectional area and a minimum cross-sectional area. In particular, the cross-sectional area that can be flowed through may be adjustable by a sliding action that can be performed in the axial direction. The displaceable cylinder module may be formed similarly to the rotating cylinder module. Displaceable means that at least one part (first cylinder) of the cylinder module is displaceable, in particular with respect to another part (second cylinder) of the cylinder module. At least one of these parts may be immovable with respect to turbine housing.

In the present embodiment, the displaceable cylinder module may in particular be a cross-section adjustment module described above. Preferably, such a cross-section adjustment equipment may be an actively operated cross-section adjustment equipment. In particular, an axial sliding action, for example, caused by a servomotor (described before), may cause a change of the at least one through-flow opening. In particular, the through-flow opening respectively its flow cross-section can be changed in such a way that the cross-sectional area is changed.

In principle, in this embodiment, a through-flow opening can presently mean a total through-flow opening, which can be formed from a plurality of individual through-flow openings.

Preferably, the displaceable cylinder module may comprise at least one first cylinder having at least one first cylinder opening and one second cylinder arranged in the first cylinder having at least one second cylinder opening corresponding to the first cylinder opening. In particular, at least two first cylinder openings and two second cylinder openings may be provided. Corresponding means that a first cylinder opening can be matched in position and shape to at least one second cylinder opening so that a through-flow opening with a certain cross-sectional area can be formed by the first cylinder opening and the second cylinder opening.

By axially moving the second cylinder relative to the first cylinder, the cross-sectional area of the at least one through-flow opening can be adjusted between the maximum cross-sectional area (in this case the first cylinder opening and the second cylinder opening (respectively the first cylinder openings and the second cylinder openings) lie substantially on top of each other) and a minimum cross-sectional area (in this case the first cylinder opening and the second cylinder opening (respectively the first cylinder openings and the second cylinder openings) do not lie substantially on top of each other, in particular lie only partially on top of each other; it may also be provided that only a first one of a plurality of openings overlies a second one of a plurality of openings).

In particular, the second cylinder and/or the first cylinder may be adjustable respectively movable by a servomotor. Preferably, the servomotor may be an electric servomotor. Preferably, the at least one generator of the tubular turbine device can supply the at least one servomotor with electrical energy. At least one of the cylinders may be at least partially integrated in the guiding equipment.

In the described cylinder modules, the fluid can flow from the respective at least one (first or second) cylinder opening to the guiding equipment, in particular, to the at least one nozzle channel. In variants of the application, at least one of the cylinders may be at least partially formed by the guiding equipment.

As described above, the cross-section adjustment equipment may also be integrated in the guiding equipment. According to a further embodiment of the tubular turbine device according to the application, the cross-section adjustment equipment may be formed by at least one adjustable guiding vane of the guiding equipment. For example, the nozzle channels may be formed by adjustable guiding vanes. By adjusting the at least one guiding vane the cross-sectional area that can be flowed through may be changeable.

In the present embodiment, the at least one adjustable guiding vane may in particular be a cross-section adjustment module described above. Preferably, such a cross-section adjustment equipment may be an actively operated cross-section adjustment equipment. In particular, a change of the at least one through-flow opening can be caused by an adjustment of a guiding vane (in particular a rotating with respect to an axis of rotation), in particular of a plurality of guiding vanes, for example, caused by a servomotor (described before). In particular, the through-flow opening respectively its flow cross-section can be changed in such a way that the cross-sectional area that can be flowed through is changed.

Preferably, the cross-section adjustment equipment can comprise at least one actuating mechanism (in particular in the form of an actuating ring) in operative connection with the at least one guiding vane of the guiding equipment. In particular, the actuating mechanism may be mechanically coupled to the guiding vanes, for example by means of a gear wheel mechanism).

Preferably, a servomotor may be provided and configured to adjust the actuating mechanism, in particular, to rotate the actuating ring. Preferably, the servomotor may be an electric servomotor. Preferably, the at least one generator of the tubular turbine device may supply electrical energy to the at least one servomotor.

According to a further embodiment of the tubular turbine device according to the application, the cross-section adjustment equipment may comprise at least one plate module with at least one blocking element arranged radially movably in a through-flow opening of the plate module. In particular, the cross-sectional area that can be flowed through can be changed by a displacement of the at least one blocking element that can be performed in the radial direction. In particular, a hub diameter can be changed by this.

In the present embodiment, the at least one adjustable blocking element together with the plate module can in particular be a cross-section adjustment module described above. Preferably, such a cross-section adjustment equipment may be an actively operated cross-section adjustment equipment. In particular, a change of the at least one flow opening can be caused by an adjustment of a blocking element, in particular a plurality of blocking elements, each arranged in a corresponding number of through-flow openings of the plate module, for example, caused by a servomotor (described before). The at least one through-flow opening respectively its flow cross-section can be changed, in particular, in such a way that the cross-sectional area that can be flowed through is changed. The surface of the plate module may be perpendicular to the direction of flow.

Preferably, the at least one blocking element may be operatively connected to a gear wheel mechanism (or a similar mechanism) rotatable by a servomotor. In particular, a rotating of the gear wheel mechanism causes a displacing of the at least one blocking element in radial direction. In particular, a plurality of blocking elements may be operatively connected to the gear wheel mechanism so that a radial displacing of the plurality of blocking elements in the respective through-flow openings may be performed simultaneously and synchronously, respectively.

As has been described, the aforementioned embodiments may in particular be actively operated cross-section adjustment equipment. In variants of the application, a passive module may be provided in these examples instead of an active module. It should also be noted that a servomotor may also in principle be another motor, such as a hydraulic motor.

According to a further embodiment of the tubular turbine device according to the application, the cross-section adjustment equipment may comprise at least one (passive) flap module arranged in the guiding equipment and configured to change a through-flow cross-section of a nozzle channel of the guiding equipment. The at least one flap module may be, in particular, a resetting flap (and resetting valve, respectively).

In the present embodiment, the at least one flappable flap module may in particular be a cross-section adjustment module as previously described. Preferably, such a cross-section adjustment equipment may be a passively operated cross-section adjustment equipment. In particular, the flap module can be moved (continuously) between an open state (in which the flow cross-sectional area of a nozzle channel substantially corresponds to the cross-sectional area of the nozzle channel (at the location of the flap module)) and a closed state (in which the nozzle channel is at least substantially closed, preferably completely closed).

Preferably, the flap module may comprise a resetting element (e.g., a spring element, a hydraulic damper (e.g., with shock absorber oil)). For example, the resetting element may be integrated in the attachment point of the flap module to an inner wall of the nozzle channel. In particular, the at least one resetting element is adapted to the tubular turbine device, in particular, to a certain flow set point velocity. Depending on the instantaneous volume flow, the cross-sectional area that can be flowed through by a fluid is (automatically) changed by the fluid exerting a force on the flap module in accordance with the instantaneous volume flow. In particular, an optimal cross-sectional area can be set for the instantaneous volume flow.

Alternatively or additionally, according to a further embodiment of the tubular turbine device according to the application, the cross-section adjustment equipment may comprise at least one valve module arranged upstream of the guiding equipment and having at least one valve opening. By changing the cross-sectional area of the valve opening, in particular, the cross-sectional area that can be flowed through can be changed.

In the present embodiment, the at least one valve module (e.g., having one or more valve(s)) may be, in particular, a cross-section adjustment module described above. Preferably, such a cross-section adjustment module may be a passively operated cross-section adjustment module. In variants of the application, the valve module may also comprise an actively operated cross-section adjustment equipment and, for example, at least one solenoid valve or electromagnetically operated valve. This can be controlled respectively actuated by a control module in the manner described above.

The valve module, in particular the at least one valve, may, in particular, be (continuously) adjustable between a fully open state and a closed state. Preferably, the at least one valve may comprise a resetting element (e.g., a spring element, a hydraulic damper (e.g., with shock absorber oil). In particular, the at least one resetting element is adapted to the tubular turbine device, in particular, to a certain flow set point velocity.

Depending on the instantaneous volume flow, the valve opening cross-sectional area and thus the cross-sectional area that can be flowed through by a fluid is changed (automatically) by the fluid exerting a force on the valve (in particular, an inflow surface of the valve coupled to the resetting element) in accordance with the instantaneous volume flow. In particular, an optimum cross-sectional area can be set for the instantaneous volume flow.

In variants of the application, a valve module may have a plurality of valves, each of which may have a resetting element with a different reset force. In this case, a different number of valves can be opened or closed depending on the volume flow. An adjustment of different cross-sectional areas is possible.

The tubular turbine device and the turbine housing, respectively, can preferably be formed in such a way that the fluid has almost the same flow direction at the housing outlet as at the housing inlet. In particular, the turbine housing can be a straight-line continuation of the first transport network pipe and, in particular, of the second transport network pipe.

Optionally, the tubular turbine device may comprise a flow straightener that may be arranged between the running equipment and the outlet. As has already been described, the running equipment is preceded by a guiding equipment (also referred to as a nozzle body), which can preferably be formed as a guide wheel-like pitch circle segment with preferably a plurality of guiding vanes. The guiding equipment can be made of aluminum, for example.

The guiding vanes can serve, in particular, for a uniform accelerating and deflecting of the fluid into the running equipment. For example, the guiding vanes form nozzle channels between them, the cross-section of whose can taper in the direction of flow so that the flow velocity of the fluid in the nozzle channels is increased. This can be used, in particular, to achieve a nozzle effect for flow accelerating. In the present context, a partial circular segment means in particular that the guiding equipment forms a circular arc section. The guiding equipment can, for example, be inserted in an opening of a generator support in the form of a segment of a circle.

A generator support for holding the at least one generator may be formed, for example, as a central disc and mounting flange for two parts of the turbine housing. The generator support may be formed, for example, as an aluminum disc having a passage for the turbine shaft and preferably having annular grooves on both sides for centering the parts of the turbine housing. The at least one generator may be flanged to one side of the generator support so that it extends quasi-floatingly in a part of the turbine housing.

The at least one generator may include a brake. In particular, when the generator is disconnected from the power grid into which the generator feeds, the generator shaft and thus the running equipment can be stopped with the aid of a brake. Idling of the generator can be avoided. Provided that the brake is no longer supplied with power, the generator can preferably be automatically decoupled from the power grid.

Furthermore, the turbine shaft may be the shaft of the generator so that the running equipment can act on the generator without the interposition of a gearbox.

The running equipment may comprise a runner having radially extending runner blades. Preferably, the runner blades may extend as a runner blade ring around the entire outer circumference of the runner. Preferably, the runner blades may have, for example, a U-shaped or V-shaped blade profile. The blade profile may be symmetrical or asymmetrical.

Furthermore, the runner blades of a runner may be single-stage. In particular, this means that only one ring of runner blades is provided. The runner blades may have a symmetrical, approximately V-shaped, cross-sectional profile and form correspondingly curved flow channels and nozzle channels, respectively, between them, which preferably have an approximately constant cross-section from the inlet side to the outlet side of the runner.

A further aspect of the application is a method for operating a tubular turbine device, in particular, a tubular turbine device according to the present disclosure. The tubular turbine device comprises at least one running equipment arranged on a turbine shaft, at least one guiding equipment arranged upstream of the running equipment in the direction of flow, and at least one generator coupled to the turbine shaft and configured to convert the mechanical energy into electrical energy. The method comprises:
  providing a fluid volume value of the tubular turbine device, and
  changing, by a cross-section adjustment equipment of the tubular turbine device, a cross-sectional area of the tubular turbine device that can be flowed through depending on a provided fluid volume value and a predetermined fluid volume set point value.

In particular, the method is a control method. In particular, an actively operable cross-sectional area adjustment equipment described above may be used.

A further aspect of the application is a fluid pressure release system for a fluid transport network. The fluid pressure release system comprises at least one previously described tubular turbine device. An inlet of the tubular turbine device is connected to a first transport network pipe (of the fluid transport network) having a first fluid pressure level, and an outlet of the tubular turbine device is connected to a second transport network pipe (of the fluid transport network) having a second fluid pressure level. The second fluid pressure level is at least lower than the first fluid pressure level.

As has been described, the fluid transport network may be a gas transport network. At least one transport network pipe and transport network line, respectively, may be at least predominantly buried.

In particular, the fluid pressure release system comprises at least one fluid pressure release facility comprising a tubular turbine device.

In the case of buried respectively underground gas pipelines, a temperature between 8° C. and 10° C. may prevail throughout the year at a usual burial depth in the ground. The gas temperature is usually the same as the ambient ground temperature. In one embodiment, a plurality of tubular turbine devices may be connected in series. If several fluid pressure release facilities (also referred to as expansion machines) are connected in series respectively cascaded, the gaseous medium between the individual fluid pressure release facilities can be reheated by utilizing the geothermal potential if the fluid pressure release facilities are spaced appropriately. This allows the internal energy of the gas and the geothermal potential to be utilized at the same time with the aid of the pressure difference.

Preferably, the distance between two adjacent fluid pressure release facilities of a fluid pressure release system in the fluid transport network can be selected such that the temperature of the gas after a first release and immediately before a further release is between 8° C. and 10° ° C.

A further application of the fluid pressure release system is an application in a "gas to power" transport network: electricity from wind turbines and/or photovoltaic systems is used to compress gases. If required, the energy stored in this way can (later) be converted back into electricity by means of the (inline) tubular turbine according to the application.

A still further aspect of the application is a use of a previously described tubular turbine device for performing fluid pressure release from a first fluid pressure level to a second fluid pressure level in a fluid transport network, wherein mechanical energy is converted into electrical energy by the generator.

It should be noted that a module, a device, etc., can be formed at least in part by software elements (in particular in the form of computer code executable by a processor) and/or at least in part by hardware elements (processor, memory means, actuator, etc.). Furthermore, it should be noted that expressions such as "first", "second", etc. do not indicate an order, but merely serve to distinguish between two elements.

Features of the tubular turbine devices, fluid pressure release systems, methods and uses may be freely combined. In particular, features of the description and/or dependent claims may be independently inventive, even by completely or partially bypassing features of the independent claims, either alone or freely combined with each other.

BRIEF DESCRIPTION OF THE DRAWINGS

There are now a multitude of possibilities for designing and further developing the tubular turbine device according to the application, the fluid pressure release system according to the application, the process according to the application and the use according to the application. For this purpose, reference is made on the one hand to the patent claims subordinate to the independent patent claims, and on the other hand to the description of embodiments in connection with the drawing. In the drawing shows:

FIG. 4b is a further schematic sectional view of the embodiment according to FIG. 4a;

FIG. 5b is a further schematic sectional view of the embodiment according to FIG. 5a;

FIG. 6b is a schematic view of the embodiment according to FIG. 6a;

FIG. 7b is a further schematic sectional view of the embodiment according to FIG. 7a;

FIG. 7c is a schematic representation of the embodiment according to FIG. 7a;

FIG. 8b is a further schematic sectional view of the embodiment according to FIG. 8a;

FIG. 8c is a further schematic sectional view of the embodiment according to FIG. 8a;

FIG. 10b is a further schematic sectional view of the embodiment according to FIG. 10a;

DETAILED DESCRIPTION

Similar reference signs are used hereinafter for similar elements. Furthermore, in the following embodiments, as a fluid a gaseous medium and gas, respectively, is always assumed. It shall be understood that the embodiments are transferable to other fluid media.

Figure 1:
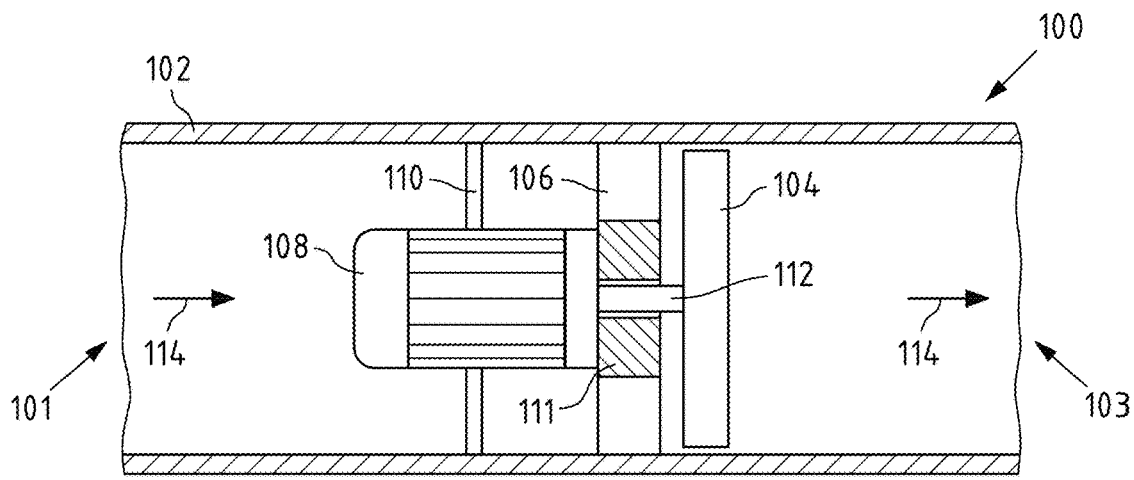
FIG. 1 is a schematic view of an embodiment of a tubular turbine device (with a generator upstream of the guiding equipment) according to the present application.

FIG. 1 shows a schematic view of an embodiment of a tubular turbine device 100 according to the present application. The tubular turbine device 100 is used to perform a fluid pressure release from a first fluid pressure level to a second fluid pressure level in a fluid transport network, while simultaneously converting mechanical energy into electrical energy by a generator 108 of the tubular turbine device 100.

The tubular turbine device 100 comprises a turbine housing 102 (e.g., made of steel or other metal). In particular, the turbine housing 102 is substantially tubular. The turbine housing 102 comprises an inlet 101 and an outlet 103. In the present embodiment, the arrow 114 indicates the direction of flow of the fluid. As can be seen, the fluid flows through the housing 102 from the inlet 101 to the outlet 103 with substantially no change in direction.

The illustrated tubular turbine device 100 for a fluid transport network comprises at least one running equipment 104 arranged on a turbine shaft 112. In particular, the running equipment 104 may comprise a runner having a plurality of runner blades.

Further, the tubular turbine device 100 comprises at least one guiding equipment 106 arranged upstream of the running equipment 104 in the direction of flow 114. The guiding equipment 106 may, in particular, comprise a plurality of nozzle channels, which in particular impress a swirl to the gas, the swirl corresponding to the blading of the runner 104, and preferably accelerate it.

The tubular turbine device 100 comprises at least one generator 108 coupled to the turbine shaft 112 and configured to convert the mechanical energy into electrical energy. In particular, the kinetic energy of the gas flowing through the tubular turbine device 100 is converted into electrical energy by the running equipment 104, the turbine shaft 112 and the generator 108. In particular, the generated electrical energy can be fed into an electrical grid.

As can be seen, in the present embodiment, the generator 108 is arranged upstream of the guiding equipment 106. As has already been described, the generator 108 may be held respectively supported "floating" in the turbine housing 102 by a generator support 111. In this embodiment, the guiding equipment 106 is integrated in the generator support 111.

The tubular turbine device 100 further comprises at least one cross-section adjustment equipment 110. The cross-section adjustment equipment 110 is configured to change a cross-sectional area (in this exemplary embodiment, an inlet cross-sectional area) of the tubular turbine device 100 that can be flowed through depending on the volume flow of the fluid, in this exemplary embodiment a gas, flowing through the tubular turbine device 100. Preferably, the cross-sectional area adjustment equipment 110 may comprise a cross-sectional area adjustment module for this purpose.

In particular, the cross-sectional area can be increased (up to a maximum possible cross-sectional area) and/or decreased (up to a minimum possible cross-sectional area) depending on the instantaneous gas volume flow. Preferably, a continuous changing and adjusting, respectively, of the cross-sectional area is possible. Discrete adjusting is also possible. By adjusting the cross-sectional area, the tubular turbine device 100 can be operated at an optimized operating point. The electrical energy output can be optimized/maximized.

As can further be seen from FIG. 1, the cross-sectional area adjustment equipment 110 is presently arranged upstream of the guiding equipment 106.

Figure 2:
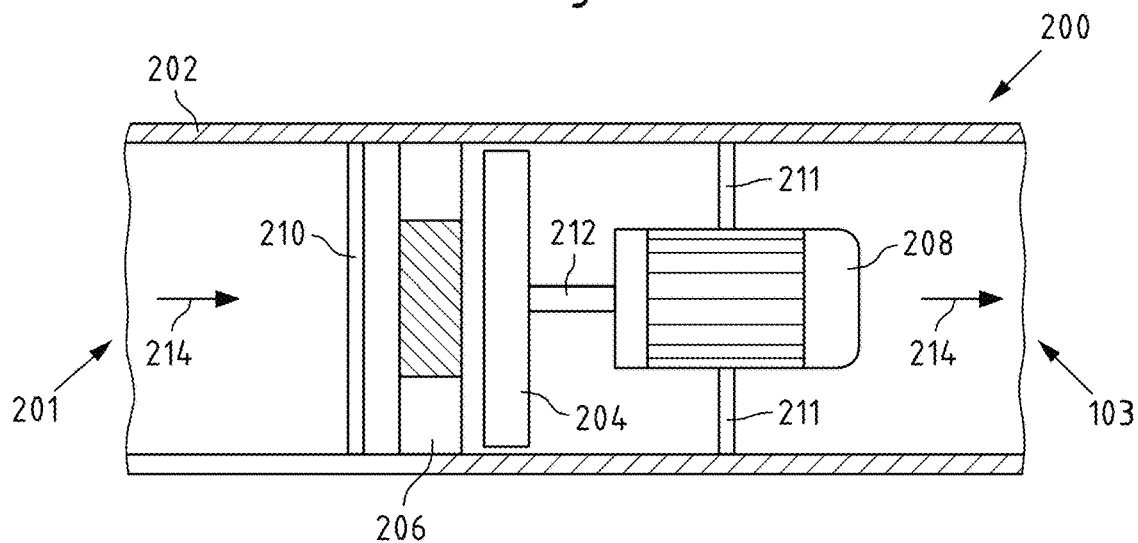
FIG. 2 is a schematic view of a further embodiment of a tubular turbine device (with a generator downstream of the running equipment) according to the present application.

FIG. 2 shows a schematic view of a further embodiment of a tubular turbine device 200 according to the present application. In order to avoid repetitions, essentially only the differences to the previous embodiment according to FIG. 1 are described below, and otherwise reference is made to the explanations of this embodiment.

As can be seen, in the present embodiment, the generator 208 is arranged downstream of the running equipment 204 in the direction of flow 214 and is held in the turbine housing 202, in particular, by means of support means 211.

Figure 3:
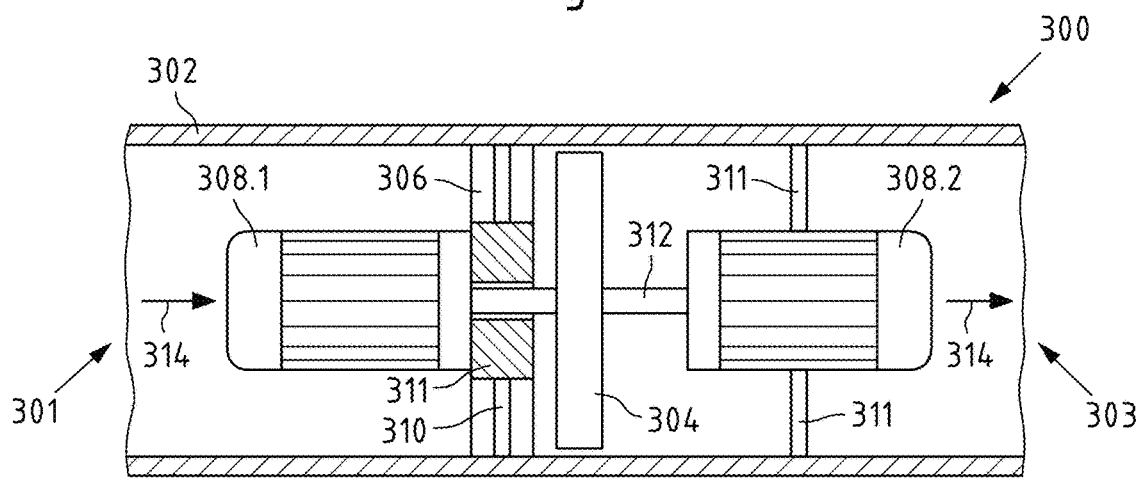
FIG. 3 is a schematic view of a further embodiment of a tubular turbine device (with two generators (one upstream of the guiding equipment and one downstream of the running means)) according to the present application.

FIG. 3 shows a schematic view of a further embodiment of a tubular turbine device 300 according to the present application. In order to avoid repetitions, essentially only the differences to the previous embodiments according to FIGS. 1 and 2 are described below, and otherwise reference is made to the explanations of these embodiments.

As can be seen, two generators 308.1, 308.2 are provided in the present case. A first generator 308.1 is arranged upstream of the running equipment 304 in the flow direction 314, and the further generator 308.2 is arranged downstream of the running equipment 304 in the flow direction 314. Compared to the previous embodiments, the generators 308.1, 308.2 (and the housing) may have a smaller cross-sectional area for comparable overall performance.

Here, the cross-section adjustment equipment 310 is integrated (by way of example) in the generator support 311 for generator 308.1 and the guiding equipment 306.

Figure 4A:
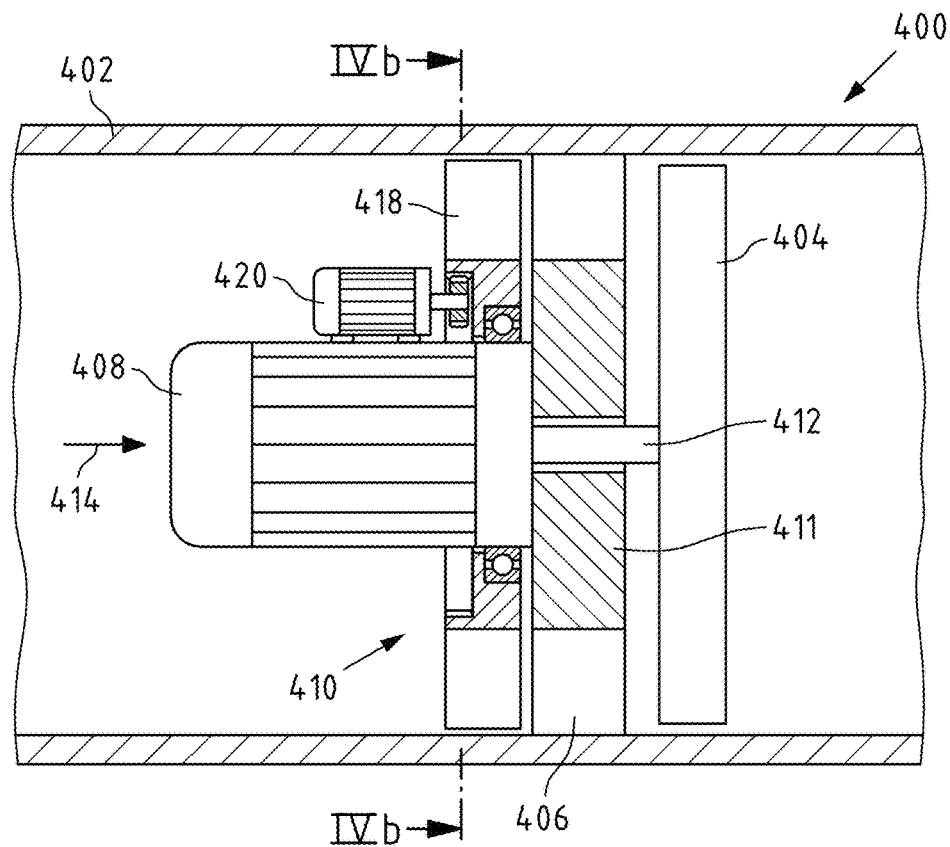
FIG. 4a is a schematic (sectional) view of a further embodiment (in particular a washer disc) of a tubular turbine device according to the present application.
Figure 4B:
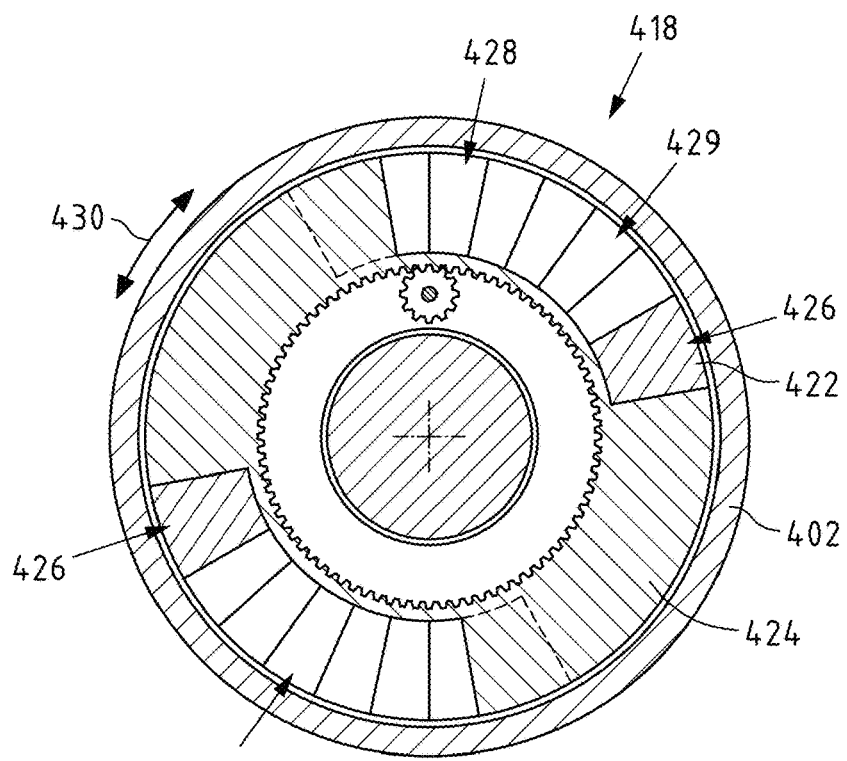

FIGS. 4a and 4b show schematic views of a further embodiment of a tubular turbine device 400 according to the present application. In order to avoid repetitions, substantially only the differences to the previous embodiments shown in FIGS. 1 through 3 are described below, and otherwise reference is made to the discussion of these embodiments. FIG. 4a shows a first sectional view of the tubular turbine device 400, and FIG. 4b shows a sectional view in the indicated plane.

As can be seen initially, the cross-section adjustment equipment 410 is arranged upstream of the guiding equipment 406. In the present case, the cross-section adjustment equipment 410 comprises a rotating disc module 418 and an (electric or hydraulic) servomotor 420. In the present case, the servomotor 420 is arranged on the generator 408 by way of example and, in particular, is attached to the generator housing.

In the present embodiment, the rotating disc module 418 comprises a central generator opening through which the generator, which is attached to the generator support 411, protrudes. If only one generator is provided behind the running equipment 404, a generator opening may not be required.

In the present embodiment, the rotating disc module 418 is formed by two discs 422, 424, i.e., a first disc 422 and a second disc 424, the discs arranged on top of each other. The first disc 422 is rotatable relative to the second disc 424. In particular, one of the discs 422, 424 may be (mechanically) coupled to the servomotor 420 such that a rotating of the first disc 422 relative to the second disc 424 is caused.

As can be seen, the first disc 422 comprises at least one first disc opening 426, in the present exemplary two first disc openings 426. Furthermore, the second disc 424 comprises at least one second disc opening 428, in the present exemplary two second disc openings 428. In particular, the at least one first disc opening 426 corresponds to the at least one second disc opening 428. In particular, the opening shape of the respective disc openings can be substantially the same.

By rotating (indicated by the arrow marked with the reference sign 430 in FIG. 4b), the at least one through-flow opening 429 and thus the cross-sectional area can be changed. Thus, by rotating the second disc 424 relative to the first disc 422, the cross-sectional area of the at least one through-flow opening 429 (in this case formed by two through-flow openings 429) may be changeable between the maximum cross-sectional area (in this case the respective first disc openings 426 and the second disc openings 428 may lie substantially on top of each other) and a minimum cross-sectional area (in this case the respective first disc openings 426 and the second disc openings 426 do not lie substantially on top of each other).

Figure 5A:
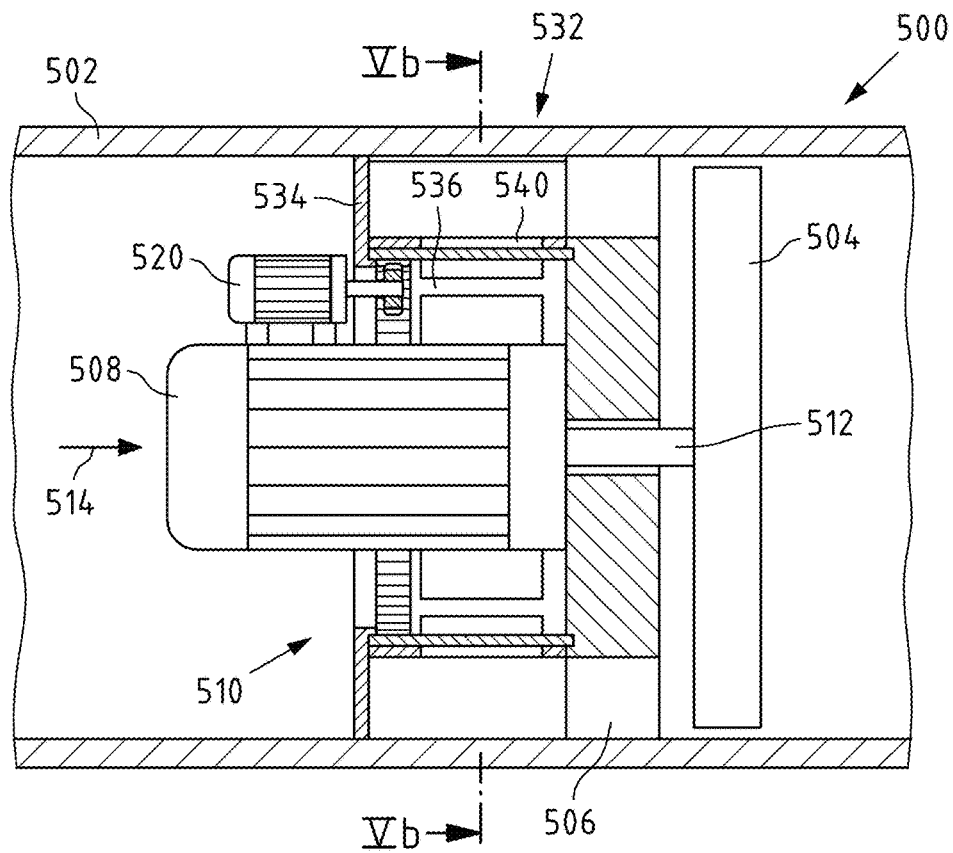
FIG. 5a is a schematic (sectional) view of a further embodiment (in particular a sleeve module with radial actuating movement) of a tubular turbine device according to the present application.
Figure 5B:
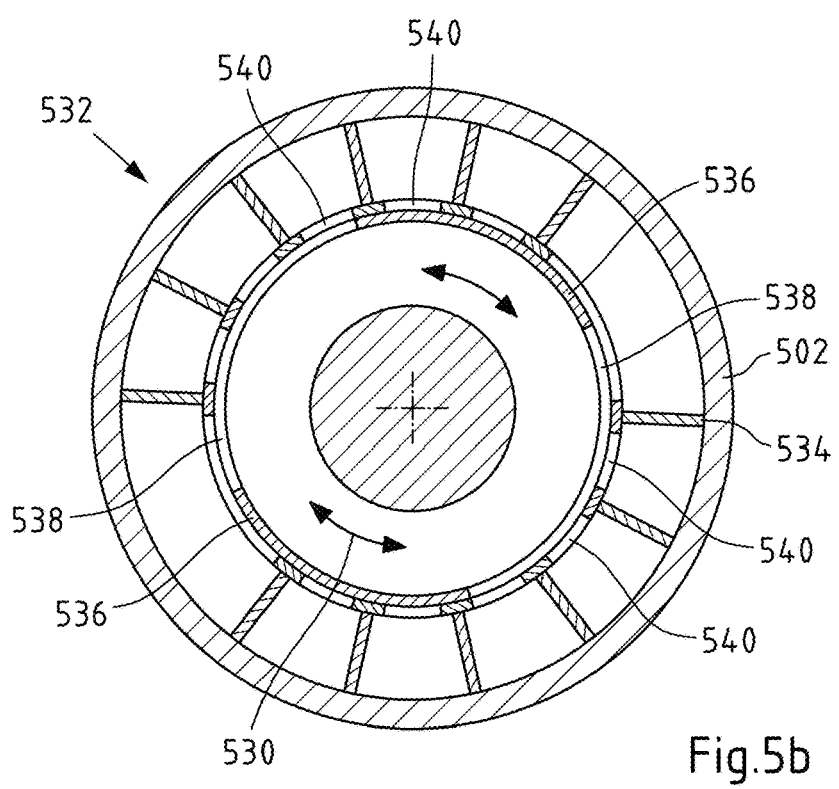

FIGS. 5a and 5b show schematic views of a further embodiment of a tubular turbine device 500 according to the present application. In order to avoid repetitions, substantially only the differences to the previous embodiments according to FIGS. 1 to 4b are described below, and otherwise reference is made to the explanations of these embodiments. FIG. 5a shows a first sectional view of the tubular turbine device 500, and FIG. 5b shows a sectional view in the indicated plane.

The illustrated cross-section adjustment equipment 510 may comprise at least one rotating cylinder module 532 arranged upstream of the guiding equipment 506 in the direction of flow 514. The cylinder module 532 may comprise at least one through-flow opening adjustable between a maximum cross-sectional area and a minimum cross-sectional area. In particular, in the present embodiment, the rotating cylinder module 532 may be a cross-section adjustment module described previously.

In the present embodiment, the cylinder module 532 comprises a central generator opening through which the generator attached to the guiding equipment 506 protrudes. If only one generator is provided downstream of the running equipment 504, a generator opening may not be required.

Preferably, such a cross-section adjustment equipment may be an actively operated cross-section adjustment equipment. In particular, a servomotor 520 (cf. FIG. 4) is provided.

Preferably, the rotating cylinder module 532 may comprise at least one first cylinder 534 (and sleeve element, respectively) having at least one first cylinder opening 540, preferably a plurality of first cylinder openings 540. Further, the rotating cylinder module 532 comprises a second cylinder 536 (and sleeve element, respectively) arranged in the first cylinder 534 and having at least one second cylinder opening 538 corresponding to the first cylinder opening 540. In particular, two second cylinder openings 538 are provided.

The servomotor 520 may be (mechanically) coupled to the second cylinder 536 such that the second cylinder 536 is rotatable relative to the first cylinder 534. As can be seen from FIGS. 5a and 5b, by rotating (indicated by the arrow marked with reference sign 530) the second cylinder 536 relative to the first cylinder 534, the cross-sectional area of the overall through-flow opening (formed by a plurality of through-flow openings) can be changed.

The through-flow openings are formed by the fact that a second cylinder opening 538 lies on to of at least one first cylinder opening 540. Again, the total through-flow opening and thus the cross-sectional area may be adjustable respectively changeable between a maximum cross-sectional area (in this case the respective first cylinder openings 538 and the second cylinder openings 540 lie substantially on top of each other) and a minimum cross-sectional area (in this case the respective first cylinder openings 538 and the second cylinder openings 540 do not lie substantially on top of each other, in particular only partially on top of each other).

Figure 6A:
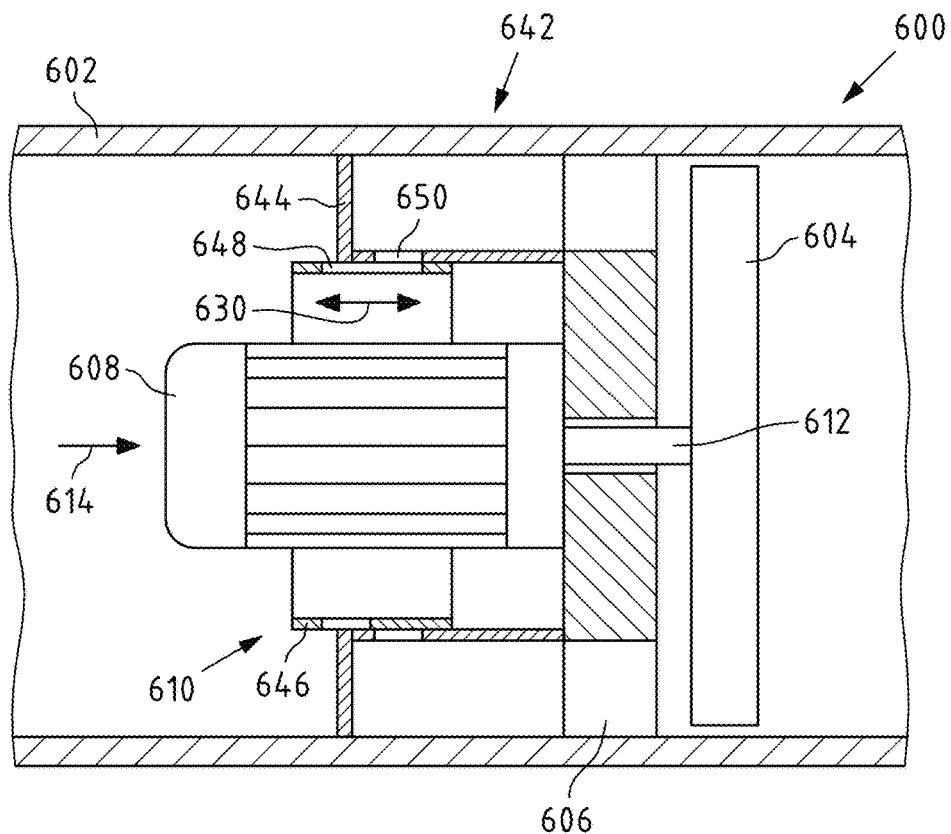
FIG. 6a is a schematic (sectional) view of a further embodiment (in particular a sleeve module with axial actuating movement) of a tubular turbine device according to the present application.
Figure 6B:
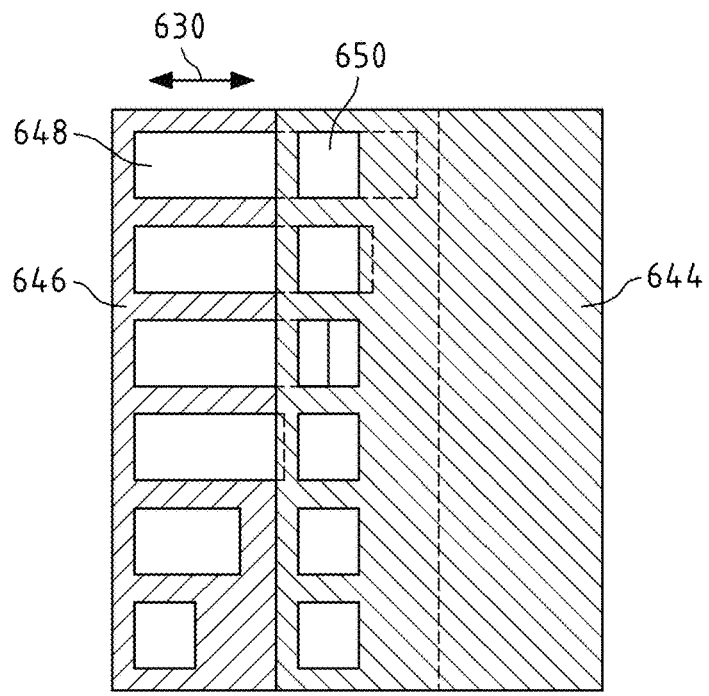

FIGS. 6a and 6b show schematic views of a further embodiment of a tubular turbine device 600 according to the present application. In order to avoid repetitions, essentially only the differences to the previous embodiments according to FIGS. 1 to 5b are described below, and otherwise reference is made to the explanations of these embodiments. FIG. 6a shows a first sectional view of the tubular turbine device 600, and FIG. 6b shows a principal sectional view.

In contrast to the embodiment according to FIGS. 5a and 5b, the present cylinder module 642 of the cross-section adjustment equipment 610 is movable and displaceable, respectively, in the axial direction (indicated by the arrow marked by the reference sign 630), in particular, between a maximum and minimum axial position. In particular, a second cylinder 646 can be axially displaced relative to a first cylinder 644. For example, the second cylinder 646 may be coupled to a servomotor such that an axial moving of the second cylinder may be caused.

As can be further seen, by axially moving the second cylinder 646 relative to the first cylinder 644, the overall through-flow opening (formed by a plurality of through-flow openings) can be changed. The through-flow openings are formed by the fact that a second cylinder opening 648 lies on top of at least one first cylinder opening 650 such that gas can flow through the respective cylinder openings to the guiding equipment 606.

Again, the total through-flow opening and thus the cross-sectional area may be adjustable and changeable, respectively, between a maximum cross-sectional area (in this case the respective first cylinder openings 648 and the second cylinder openings 650 lie substantially on top of each other) and a minimum cross-sectional area (in this case the respective first cylinder openings 648 and the second cylinder openings 650 do not lie substantially on top of each other, in particular, only partially on top of each other).

Figure 7A:
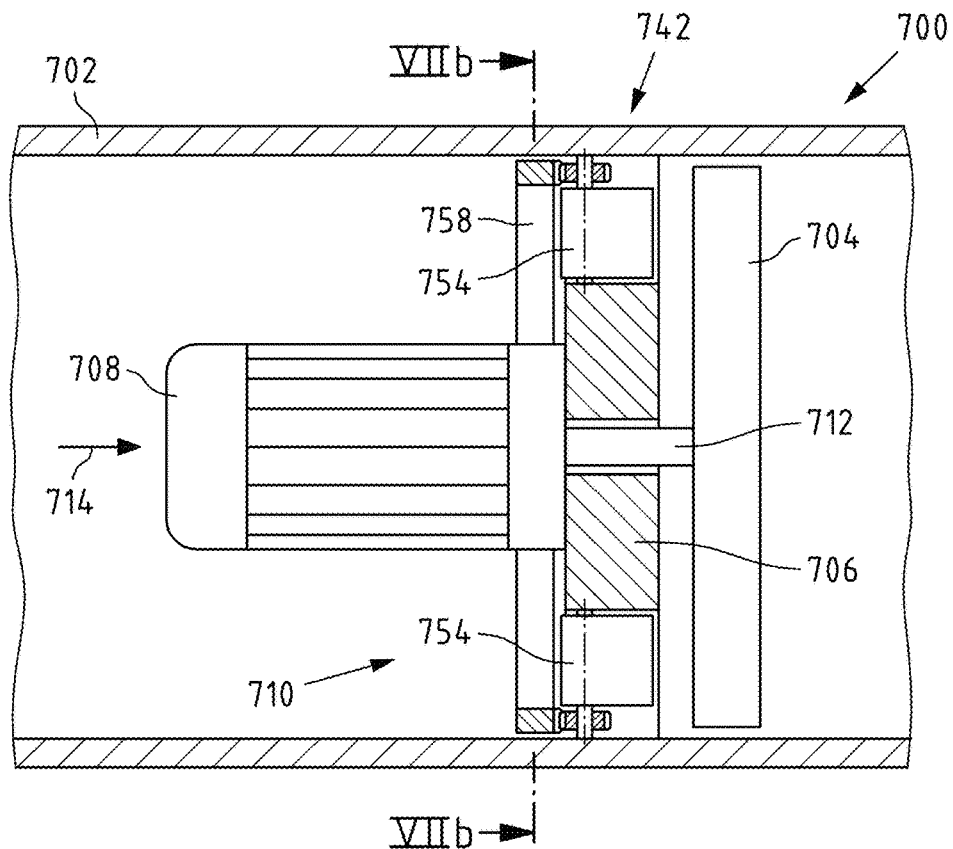
FIG. 7a is a schematic (sectional) view of a further embodiment (in particular an adjustable guiding vane) of a tubular turbine device according to the present application.
Figure 7B:
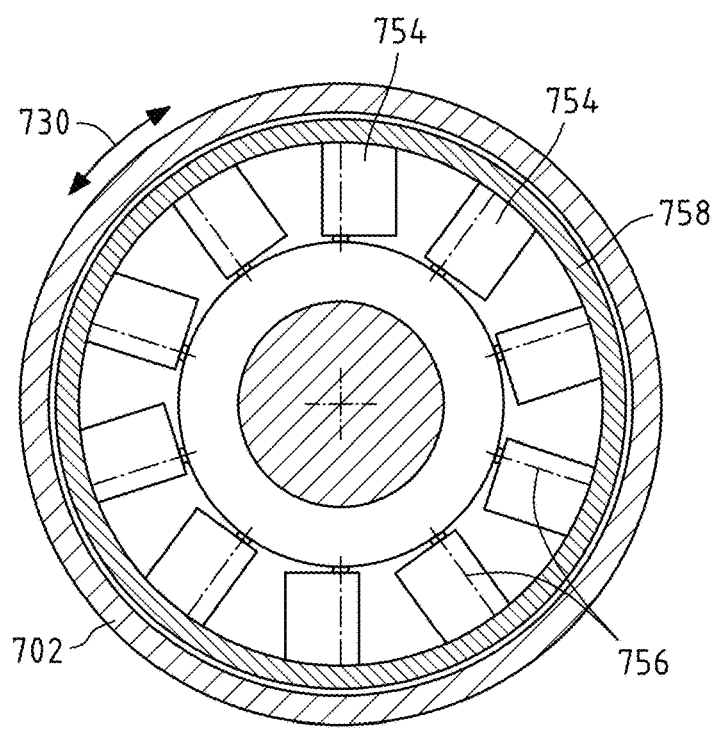
Figure 7C:
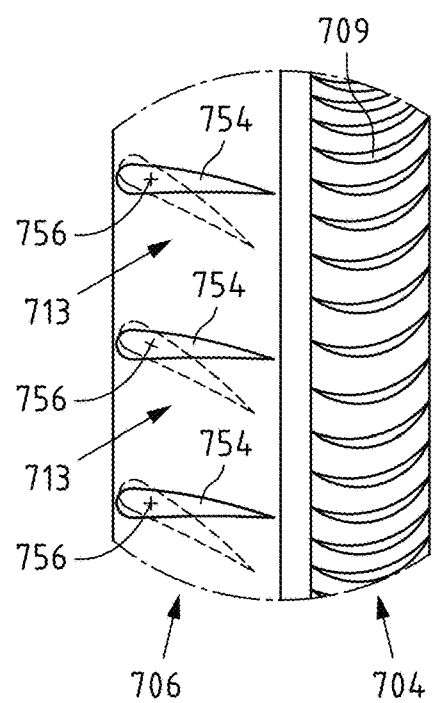

FIGS. 7a, 7b and 7c show schematic views of a further embodiment of a tubular turbine device 700 (in particular, only a section is shown for the benefit of a better overview) according to the present application. In order to avoid repetitions, essentially only the differences to the previous embodiments according to FIGS. 1 to 6b are described below, and otherwise reference is made to the explanations of these embodiments. FIG. 7a shows a first sectional view of the tubular turbine device 700, FIG. 7b shows a sectional view in the marked plane, and FIG. 7c shows a principle view.

In the present embodiment, the guiding equipment 706 and the running equipment 704 are shown in more detail by way of example. As can be seen, the running equipment 704 comprises a plurality of runner blades 709 arranged on a runner of the running equipment 704.

The guiding equipment 706 comprises a plurality of nozzle channels 713. In the present embodiment, these are formed by a plurality of guiding vanes 754.

In the present embodiment, the cross-section adjustment equipment 710 is at least partially integrated in the guiding equipment 706, in particular by means of the adjustable guiding vanes 754. In addition, the cross-section adjustment equipment 710 comprises an adjusting mechanism, in the present case in the form of an actuating ring 758, that is adjustable by a servomotor.

In particular, a guiding vane 754 is rotatable about an axis of rotation 756. In order to rotate a guiding vane 754, in particular all guiding vanes 754, in a synchronous manner, each guiding vane 754 is (mechanically) coupled to the rotatable actuating ring in such a way that a rotating (indicated by the arrow marked with the reference sign 730) of the actuating ring 758 leads to a (corresponding) rotating of all guiding vanes 754. For example, the coupling is realized by a gear wheel mechanism.

FIG. 7c shows the guiding vanes 754 in two different positions (solid representation and dashed representation). In particular, it is apparent from FIG. 7c that a rotating respectively an adjusting of the at least one guiding vane 754 can change the cross-sectional area that can be flowed through, in particular, formed by the respective adjustable cross-sections of the nozzle channels 713. In the present embodiment, the at least one adjustable guiding vane 754 may in particular be a cross-section adjustment module 754 described above.

Figure 8A:
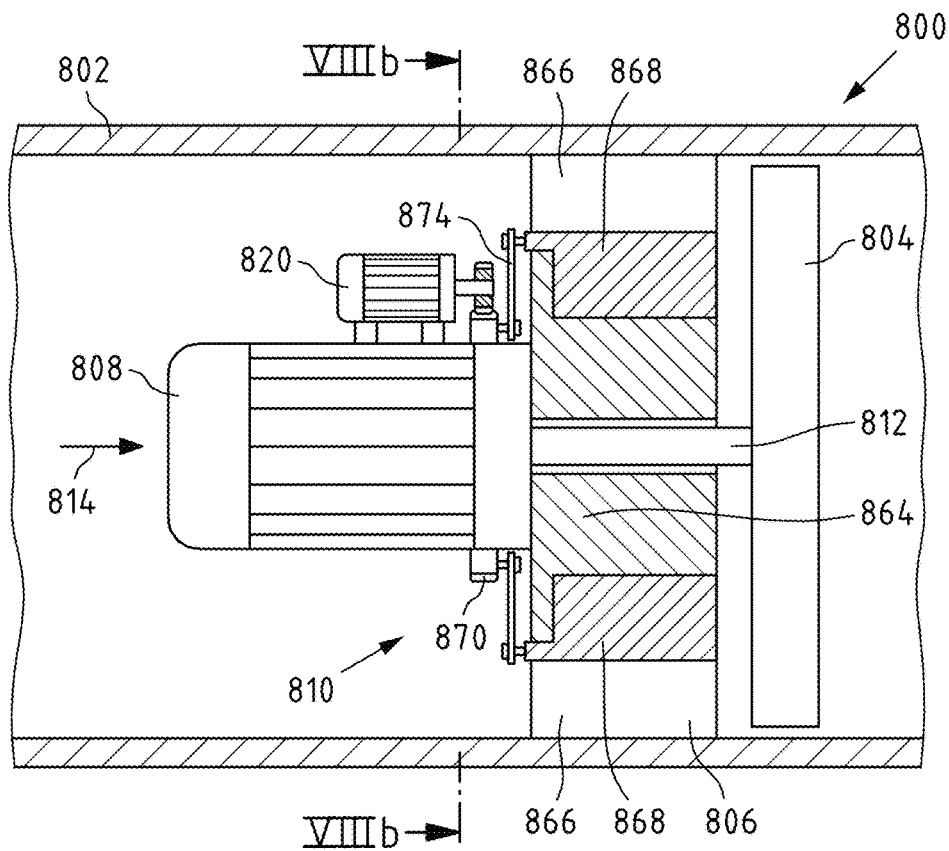
FIG. 8a is a schematic (sectional) view of a further embodiment (in particular a plate module) of a tubular turbine device according to the present application.
Figure 8B:
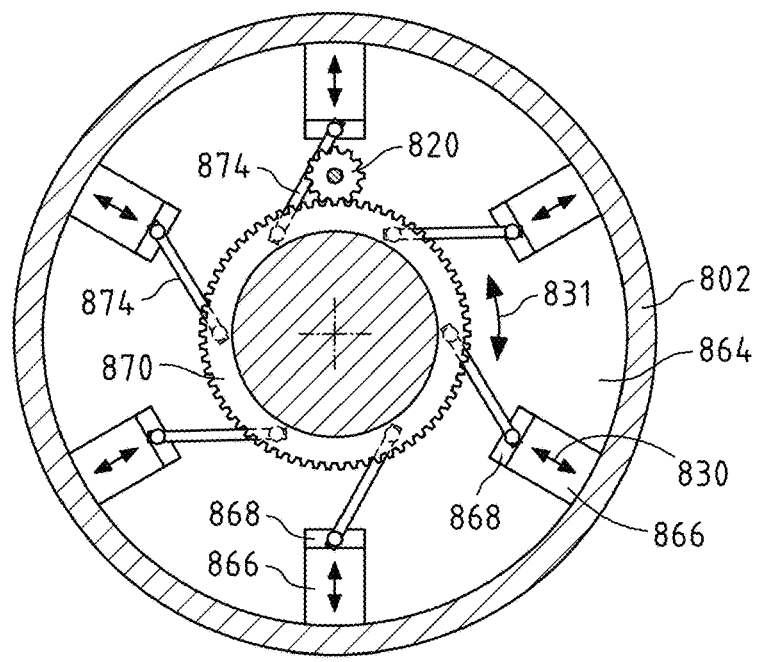
Figure 8C:
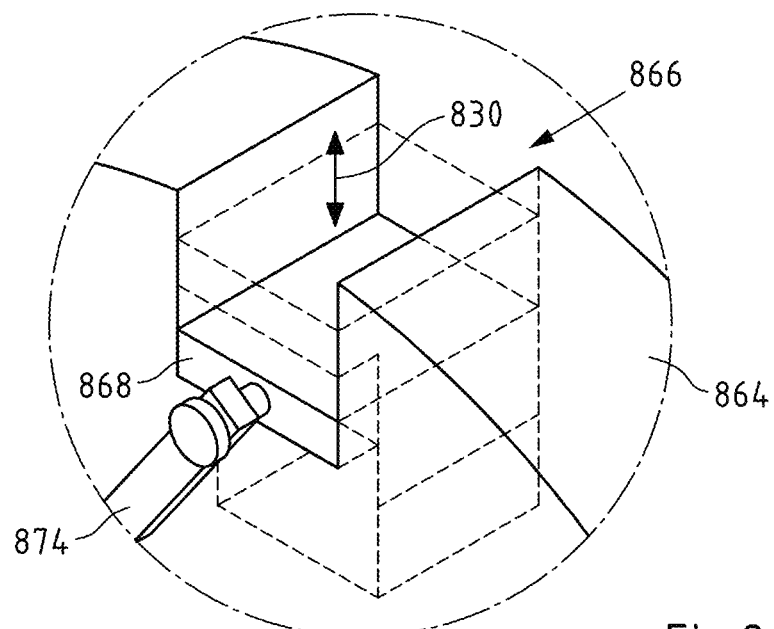

FIGS. 8a, 8b and 8c show schematic views of a further embodiment of a tubular turbine device 800 (in particular, only a section is shown for the benefit of a better overview) according to the present application. In order to avoid repetitions, essentially only the differences to the previous embodiments according to FIGS. 1 to 7c are described below, and otherwise reference is made to the explanations of these embodiments.

FIG. 8a shows a first sectional view of the tubular turbine device 800, FIG. 8b shows a further sectional view of the tubular turbine device 800, and FIG. 8c shows an enlarged perspective view of a blocking element 868 of the cross-section adjustment equipment 810, the blocking element 868 arranged radially movably in a through-flow opening 866 of the plate module 864.

As can be seen, a plate module 864 represents the guiding equipment 806. In other words, the guiding equipment is presently formed by the plate module. The plate module 864 comprises at least one through-flow opening 866, in the present case a plurality of through-flow openings 866. A through-flow opening 866 corresponds to a nozzle channel of the guiding equipment 806.

In particular, a radially movable blocking element 868 is arranged in each nozzle opening 866. The radial movability between a maximum radial position and a minimum radial position (shown in FIGS. 8a-c) is indicated by the arrow marked with the reference sign 830.

In addition to the plate module 864 with the nozzle openings 866, the cross-section adjustment equipment 810 comprises a gear wheel mechanism 870, which is (mechanically) coupled to the respective blocking elements 868 by means of connecting elements 874.

By means of the connecting elements 874, the at least one blocking element 868 can be in operative connection with the gear wheel mechanism 870 (or a similar mechanism) which can be rotated by the servomotor 820 (indicated by the arrow marked with the reference sign 831).

In particular, a rotating of the gear wheel mechanism 870 causes a displacing of the at least one blocking element 868 in radial direction 830. In particular, a plurality of blocking elements 868 may be operatively connected to the gear wheel mechanism 870 so that a radial displacement of the plurality of blocking elements 868 in the respective through-flow openings 866 may be performed simultaneously and synchronously, respectively.

In variants of the application, the plate module may also be formed by the guiding equipment and the radially movable blocking elements may be movably arranged in through-flow openings of the guiding equipment.

Figure 9:
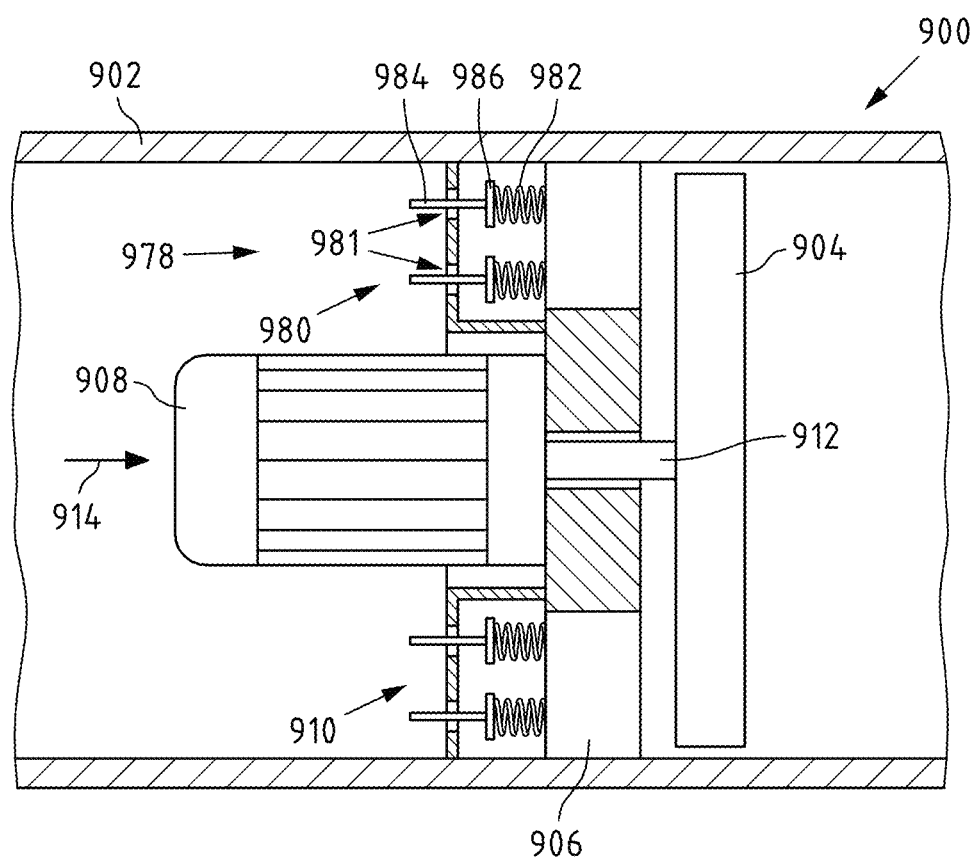
FIG. 9 is a schematic view of a further embodiment (in particular a valve module) of a tubular turbine device according to the present application.

FIG. 9 shows a schematic view of a further embodiment of a tubular turbine device 900 according to the present application. In order to avoid repetitions, essentially only the differences to the previous embodiments according to FIGS.

1 to 8c are described below, and otherwise reference is made to the explanations of these embodiments.

In the illustrated embodiment, the cross-section adjustment equipment 910 is arranged upstream of the guiding equipment 906. Preferably, the cross-section adjustment equipment 910 is a passively operable cross-section adjustment equipment 910. In particular, a valve module 978 is provided as the cross-section adjustment module 978. The valve module 978 comprises at least one valve 980, presently a plurality of valves 980.

Each valve 980 comprises a valve opening 982, which is (continuously) adjustable, in particular, between a fully closed (minimum) state and a fully open (maximum) state. For this purpose, each valve 980 comprises a resetting element 982 in the form of a spring element 982. It shall be understood that an oil-based damping element or the like can also be provided. When fully open, a through flow channel has its maximum possible through-flow cross-section.

The individual valves 980 of a valve module 978 may have differently dimensioned resetting elements 982 so that different opening time points are possible depending on the (instantaneous) volume flow.

One end of the resetting element 982 may be attached to the guiding equipment 906, and an inflow surface 986 may be arranged at the further end of the resetting element 982.

The gas flows in the direction of flow 914 and, in particular, hits the inflow surface 986. Depending on the (instantaneous) volume flow, a corresponding force is exerted by the gas on the inflow surface 986 and, in particular, the respective valve opening 982 respectively valve opening cross-sectional area 982 is adjusted accordingly. In other words, the cross-sectional area is (passively) changed depending on the (instantaneous) volume flow.

In other variants, other types of valves may be used, such as (active) solenoid valves.

Figure 10A:
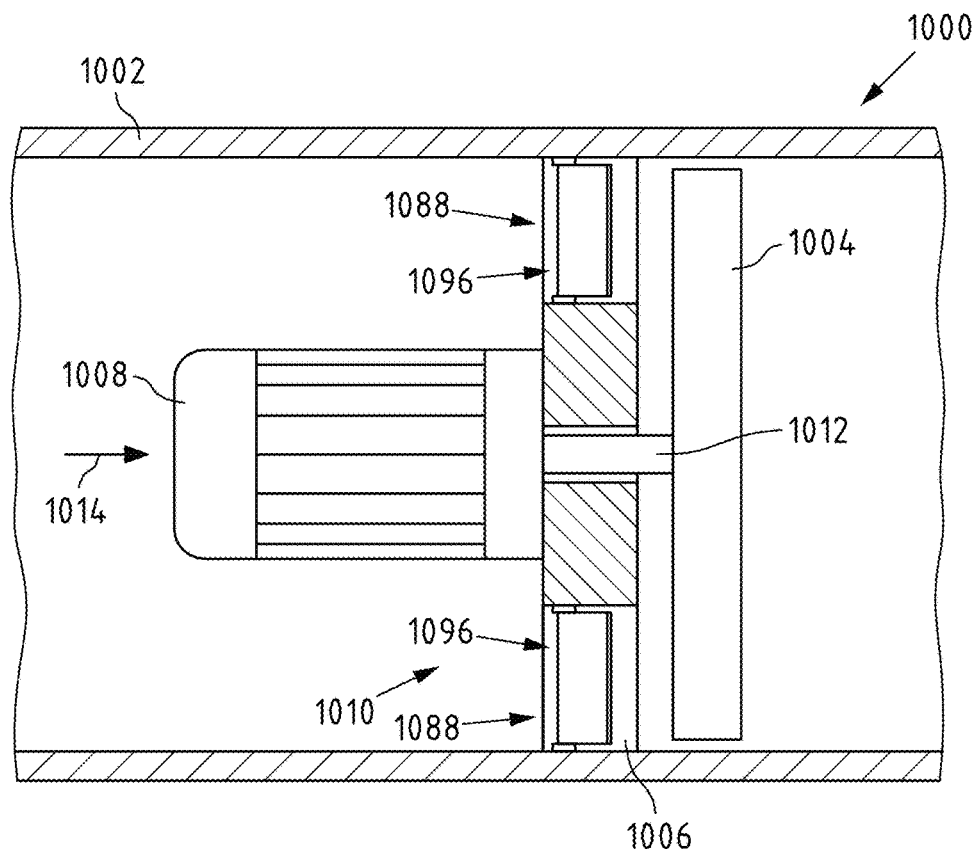
FIG. 10a is a schematic (sectional) view of a further embodiment (in particular a valve module) of a tubular turbine device according to the present application.
Figure 10B:
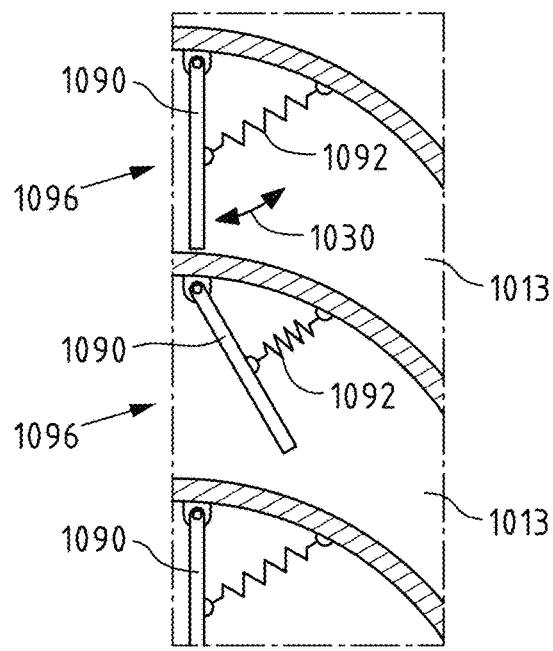

FIGS. 10a and 10b show schematic views of a further embodiment of a tubular turbine device 1000 (in particular, only a section is shown for the benefit of a better overview) according to the present application. In order to avoid repetitions, essentially only the differences to the previous embodiments according to FIGS. 1 to 9 are described below, and otherwise reference is made to the explanations of these embodiments. FIG. 10a shows a first sectional view of the tubular turbine device 1000, and FIG. 10b shows a principal sectional view.

In the illustrated embodiment, the cross-section adjustment equipment 1010 is arranged in the guiding equipment 1006. Preferably, the cross-section adjustment equipment 1010 is a passively operable cross-section adjustment equipment 1010. In particular, a flap module 1088, presently a plurality of flap modules, is provided as the cross-section adjustment module 1088.

A flap module 1088 comprises a movable (indicated by the arrow marked with the reference sign 1030), in particular flappable, flap 1090 comprising, for example, a free end and an end fixed to the inner wall of a nozzle channel 1013. Furthermore, a resetting element 1092 (e.g., a spring element 1092) may be attached between an inner wall of the nozzle channel and the flap 1090. In other variants, the resetting element may (additionally or alternatively) be integrated in the connection point.

The gas flows in the direction of flow 1014 and in particular hits a flap 1090, in particular an inflow surface of the flap 1090. Depending on the (instantaneous) volume flow, a corresponding force is exerted by the gas on the flap 1090 and the respective flap opening 1096 respectively flap opening cross-sectional area 1096 is adjusted accordingly. In other words, the cross-sectional area is changed depending on the (instantaneous) volume flow.

The individual resetting elements 1092 can preferably be dimensioned differently so that different opening time points are possible depending on the (instantaneous) volume flow.

In other variants of the application, other types of modules may also be used in the guiding equipment, such as valves (e.g., passive valves, (active) solenoid valves, etc.).

It shall be understood that the aforementioned embodiments may be combined, at least in part.

Figure 11:
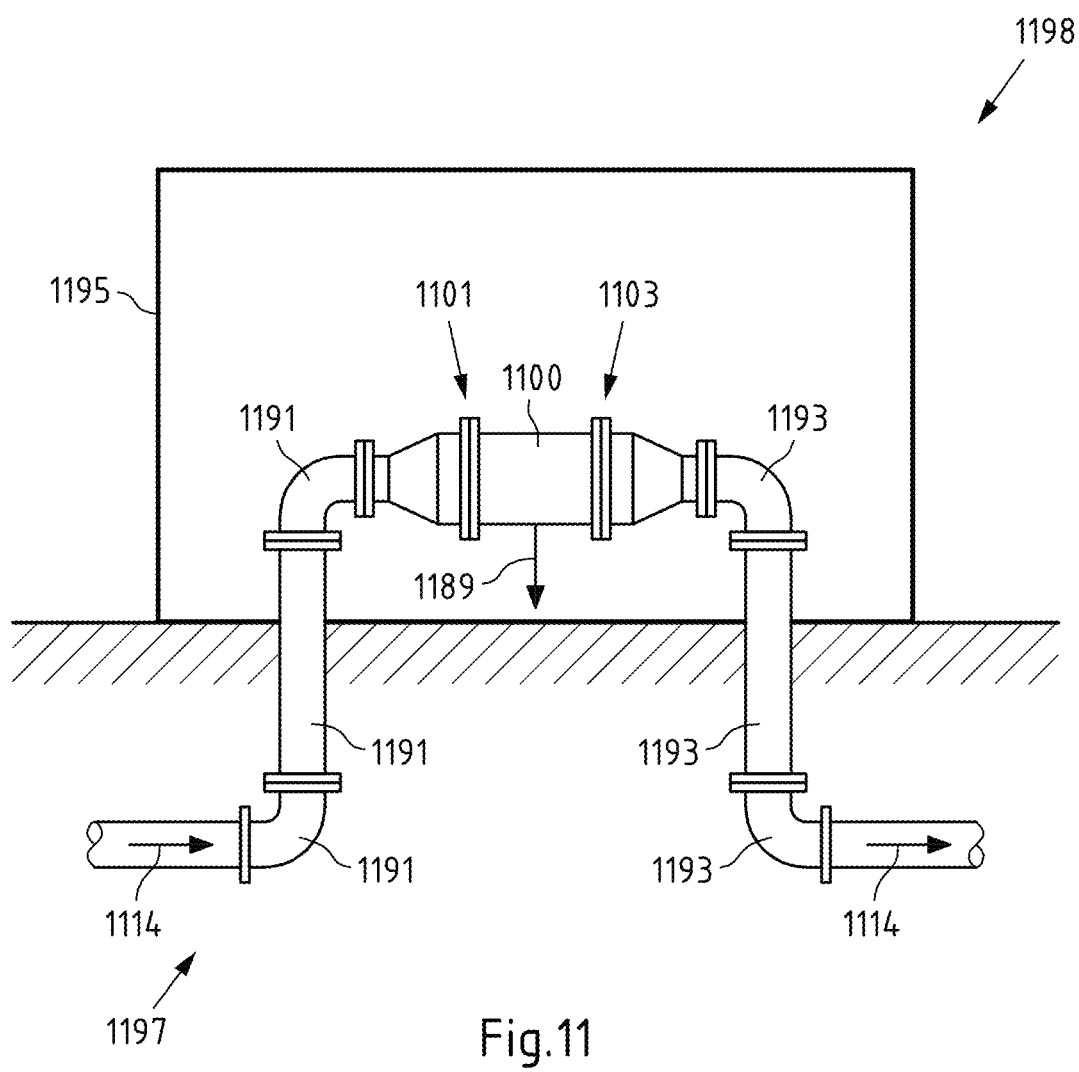
FIG. 11 is a schematic view of an embodiment of a fluid pressure release system according to the present application.

FIG. 11 shows a schematic view of an embodiment of a fluid pressure release system 1198 according to the present application. The fluid pressure release system 1198 comprises at least one tubular turbine device 1100, for example, a tubular turbine device 1100 according to one of the embodiments according to FIGS. 1 to 10. In favor of a better overview, details of the tubular turbine device 1100 have not been shown in this figure.

In particular, the fluid pressure release system 1198 comprises at least one fluid pressure release system 1195 comprising a tubular turbine device 1100. As has been described, a plurality of fluid pressure release systems 1195 each having a tubular turbine device 1100 may be connected in series to utilize a particular overall fluid pressure gradient.

As can be further seen from FIG. 11, in the present case, an inlet 1101 of the tubular turbine device 1100 is connected to a first transport network pipe 1191 having a first fluid pressure level and an outlet 1103 of the tubular turbine device 1100 is connected to a second transport network pipe 1193 having a second fluid pressure level. In particular, the pipes 1191, 1193 are flanged.

The second fluid pressure level, i.e., the fluid pressure level downstream 1114 of the tubular turbine device 1100, is lower than the first fluid pressure level, i.e., the fluid pressure level upstream 1114 of the tubular turbine device 1100.

In particular, the fluid pressure release system 1198 and the tubular turbine device 1100, respectively, is used to perform a fluid pressure release from the first fluid pressure level to the second fluid pressure level in the fluid transport network 1197, wherein mechanical energy is converted to electrical energy by the generator of the tubular turbine device 1100.

The electrical energy may be supplied to an electrical grid by means of an electrical connection 1189.

Figure 12:
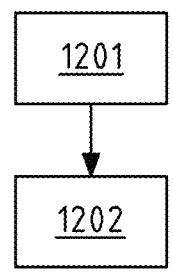
FIG. 12 is a diagram of an embodiment of a method according to the present application.

FIG. 12 shows a diagram of an embodiment of a method according to the present application. In particular, the method is used for operating a tubular turbine device with an actively operable cross-section adjustment equipment (see, for example, FIGS. 4 to 10).

In a first step 1201, a fluid volume value of the tubular turbine device is provided. The at least one fluid volume value (for example, a fluid flow rate) can be measured by a measurement module and provided by it via a (wireless and/or wired) communication network, in particular provided to a control module.

The provided (instantaneous and, in particular, continuously measured) fluid volume value can be measured, for example, by a measuring module (located anyway) in a control station of the fluid transport network and then transmitted, in particular, to the control module of a servomotor.

Alternatively or additionally, the tubular turbine device can comprise a measuring module configured to measure the (instantaneous) fluid volume value in the tubular turbine device, for example downstream of the cross-section adjustment equipment (i.e., in particular downstream of the variable cross-section area). This measuring module can also provide the measured fluid volume value, in particular be transmitted to the control module of a servomotor.

For the sake of a better overview, the illustration of the measuring modules in the previous embodiments has been omitted.

In a further step 1202, a cross-sectional area of the tubular turbine device that can be flowed through is changed or adjusted, by a cross-section adjustment equipment of the tubular turbine device, depending on the provided fluid volume value and a predetermined fluid volume set point (as was described previously).

In particular, a control module may control a servomotor such that the cross-sectional area is changed depending on the determined difference between the provided fluid volume value and a predetermined fluid volume set point, as has been described previously.

A fluid volume set point may be predetermined such that the tubular turbine device is (always, at least nearly always) operated at the optimum operating point. The electrical energy output can be further improved. The control module can be integrated in the servomotor, for example. The servomotor can be controlled, in particular regulated, in such a way that the fluid impinging on the running equipment always has the optimum flow velocity, in particular for optimizing performance.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A tubular turbine device for a fluid transport network, comprising:
   at least one running equipment arranged on a turbine shaft,
   at least one guiding equipment arranged upstream of the running equipment, and
   at least one generator coupled to the turbine shaft and configured to convert a mechanical energy into electrical energy,
   at least one cross-section adjustment equipment configured to change a cross-sectional area of the tubular turbine device that can be flowed through depending on the volume flow of the fluid flowing through the tubular turbine device,
   wherein the cross-section adjustment equipment comprises at least one plate module with at least one blocking element arranged radially movably in a through-flow opening of the plate module.

2. The tubular turbine device according to claim 1, wherein
   the cross-section adjustment equipment is configured to reduce the cross-sectional area that can be flowed through by the fluid when the volume flow of the fluid flowing through the tubular turbine device is reduced, and/or
   the cross-section adjustment equipment is configured to increase the cross-sectional area that can be flowed through by the fluid when the volume flow of the fluid flowing through the tubular turbine device increases.

3. The tubular turbine device according to claim 1, wherein
   the cross-sectional adjustment equipment is configured to change the cross-sectional area through which fluid can flow such that the flow velocity of the fluid flowing through the tubular turbine device through the cross-sectional area remains substantially the same.

4. The tubular turbine device according to claim 1, wherein
   the cross-section adjustment equipment is a passively operated cross-section adjustment equipment.

5. The tubular turbine device according to claim 1, wherein
   the cross-section adjustment equipment is an actively operated cross-section adjustment equipment.

6. The tubular turbine device according to claim 5, wherein
   the cross-section adjustment equipment comprises at least one cross-section adjustment module adjustable by a servomotor and configured to change the cross-sectional area that can be flowed through, and
   the cross-section adjustment equipment comprises at least one control module configured to control the servomotor depending on a provided fluid volume value and a predetermined fluid volume set point.

7. The tubular turbine device according to claim 1, wherein
   the cross-section adjustment equipment is integrated in the guiding equipment.

8. The tubular turbine device according to claim 1, wherein
   the cross-sectional area that can be flowed through is changeable by displacing the at least one blocking element in the radial direction.

9. A method for operating a tubular turbine device, wherein the tubular turbine device comprises at least one running equipment, at least one guiding equipment arranged upstream of the running equipment in the direction of flow, and at least one generator coupled to a turbine shaft and configured to convert a mechanical energy into electrical energy, the method comprising:
  providing a fluid volume value of the tubular turbine device, and
  changing, by a cross-sectional adjustment equipment of the tubular turbine device, a cross-sectional area of the tubular turbine device that can be flowed through depending on a provided fluid volume value and a predetermined fluid volume set point,
  wherein the cross-section adjustment equipment comprises at least one plate module with at least one blocking element arranged radially movably in a through-flow opening of the plate module.

10. A fluid pressure release system for a fluid transport network, comprising:
  at least one tubular turbine device according to claim 1,
  wherein an inlet of the tubular turbine device is connected to a first transport network pipe having a first fluid pressure level and an outlet of the tubular turbine device is connected to a second transport network pipe having a second fluid pressure level,
  wherein the second fluid pressure level is less than the first fluid pressure level.

11. A method comprising:
  utilizing the tubular turbine device according to claim 1 for performing a fluid pressure release from a first fluid pressure level to a second fluid pressure level in a fluid transport network, wherein mechanical energy is converted to electrical energy by the generator.

12. The method according to claim 9, wherein the tubular turbine device is for a fluid transport network, and further comprises:
  at least one cross-section adjustment equipment configured to change a cross-sectional area of the tubular turbine device that can be flowed through depending on the volume flow of the fluid flowing through the tubular turbine device,
  wherein the cross-section adjustment equipment comprises at least one plate module with at least one blocking element arranged radially movably in a through-flow opening of the plate module, and
  wherein the at least one running equipment is arranged on a turbine shaft.

13. The fluid pressure release system according to claim 10, wherein the fluid pressure release system is a gas pressure release system for a gas transport network.

\* \* \* \* \*

UNITED STATES PATENT AND TRADEMARK OFFICE
CERTIFICATE OF CORRECTION

PATENT NO. : 12,135,004 B2
APPLICATION NO. : 18/423808
DATED : November 5, 2024
INVENTOR(S) : Christian Effing et al.

Page 1 of 1

It is certified that error appears in the above-identified patent and that said Letters Patent is hereby corrected as shown below:

On the Title Page

Add:
--(30) Foreign Application Priority Data
Jul. 30, 2021 (DE) ... ... 10 2021 119 820--

Signed and Sealed this
Twenty-eighth Day of January, 2025

Coke Morgan Stewart
*Acting Director of the United States Patent and Trademark Office*